(12) United States Patent
Waki et al.

(10) Patent No.: US 6,681,075 B1
(45) Date of Patent: Jan. 20, 2004

(54) DATA TRANSMISSION APPARATUS AND DATA RECEPTION APPARATUS

(75) Inventors: Hiroyuki Waki, Hirakata (JP); Masahiro Oashi, Kyotanabe (JP); Tatsuya Shimoji, Neyagawa (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 0 days.

(21) Appl. No.: 09/485,438

(22) PCT Filed: Jun. 9, 1999

(86) PCT No.: PCT/JP99/03071
§ 371 (c)(1),
(2), (4) Date: Feb. 9, 2000

(87) PCT Pub. No.: WO99/65206
PCT Pub. Date: Dec. 16, 1999

(30) Foreign Application Priority Data

Jun. 10, 1998 (JP) ............................................ 10-161846

(51) Int. Cl.$^7$ ................................................. H04N 5/91
(52) U.S. Cl. ............................ 386/46; 386/83; 386/95; 707/101; 707/104.1
(58) Field of Search ...................... 386/46.85, 125.83; 707/101, 104.1; H04N 5/91

(56) References Cited

U.S. PATENT DOCUMENTS

| | | | | |
|---|---|---|---|---|
| 5,222,235 A | * | 6/1993 | Hintz et al. | 707/101 |
| 5,532,833 A | * | 7/1996 | Hong et al. | 386/77 |
| 5,724,605 A | | 3/1998 | Wissner | |
| 5,729,708 A | * | 3/1998 | Satoh et al. | 710/52 |
| 5,778,374 A | * | 7/1998 | Dang et al. | 707/101 |
| 5,881,379 A | * | 3/1999 | Beier et al. | 707/101 |
| 6,208,992 B1 | * | 3/2001 | Bruckner | 707/100 |
| 6,311,011 B1 | * | 10/2001 | Kuroda | 386/46 |
| 6,330,572 B1 | * | 12/2001 | Sitka | 707/100 |
| 6,587,637 B2 | * | 7/2003 | Nagasaka et al. | 386/69 |

OTHER PUBLICATIONS

Matsushita Technical Journal, vol. 44, No. 1(2.98), pp. 20–26, Feb. 1998.

* cited by examiner

Primary Examiner—Vincent Boccio

(57) ABSTRACT

A data reception apparatus that includes a storage unit 263 for storing a direct directory message body specifying a data block identifier by the reference name, a key information selection unit 258 for obtaining the reference name, a reception unit 152 for receiving multiplexed data of indirect directory message blocks, data blocks, and the direct directory message body data, a separation unit 254 for separating the multiplexed data, a directly obtaining unit 264 for outputting the data block identifier using the direct directory message body, a selection unit 155 for outputting the identifier using indirect directory message bodies, a directory message body obtaining unit 156, an indirect obtaining unit 257, a data block selection unit 253 for selecting the data block according to the output identifier and for extracting a data file, a selection unit 261 for restoring and storing the direct directory message body, and a restoration unit 262. When a direct directory message body includes a reference name, a data block identifier may be directly specified by the reference name without tracing indirect directory message bodies, and when a direct directory message body does not include a reference name, another direct directory message body is obtained and stored. As a result, the time for reception process is reduced.

16 Claims, 34 Drawing Sheets

FIG. 2

```
{:Scene(" ~/display" 0)
    :Items {
        {:Stream10
            :IniitallyActive true
            :CHook3
            :OrigContent :ContentRef(" ~/media/audio.aif")
            :Multiplex{
                {:Audio2
                    :ComponentTag1
                    :OrigVolume100
                }
            }
            :Storage stream
            :Looping1
        }
        {:Bitmap3
            :InitiallyActive false
            :CHook4
            :OrigContent:ContentRef(" ~/bitmap.png")
            :OrigBoxSize 320 240
            :OrigPosition 160 120
        }
    }
    :InputEventReg1
    :SceneCS 640 480
}
```

FIG. 4

FILE "root"

⟨BIOP::MessageHeader⟩ objectKey="K0";
objectKind="srg";
objectInfo= ⟨nil⟩
ServiceContextList;

bindingName={
         "display", "DSM::File"
};
bindingType=1;
IOP::IOR={
         .
         .
         BIOP::ObjectLocation{
                  carouselId=0;
                  moduleId=1;
                  DSM::Version={
                           0x01, 0x00
                  };
                  objectKey="K1";
         }
         .
         .
};
objectInfo= ⟨nil⟩ bindingName={
         "bitmap.png", "DSM::File"
};
bindingType=1;
IOP::IOR={
         .
         .
         BIOP::ObjectLocation{
                  carouselId=0;
                  moduleId=1;
                  DSM::Version={
                           0x01, 0x00
                  };
                  objectKey="K2";
         }
         .
         .
};
objectInfo= ⟨nil⟩ ;

bindingName={
         "media", "DSM::Directory"
};
bindingType=2;
IOP::IOR={
         .
         .
         BIOP::ObjectLocation{
                  carouselId=0;
                  moduleId=2;
                  DSM::Version={
                           0x01, 0x00
                  };
                  objectKey="K0";
         }
         .
         .
};
objectInfo= ⟨nil⟩ ;

FIG. 5

FILE "media"

| ⟨BIOP::MessageHeader⟩ |
|---|
| objectKey="K0";<br>objectKind="dir";<br>objectInfo= ⟨nil⟩<br>ServiceContextList; |
| bindingName={<br>    "audio.aif", "DSM::Stream"<br>}:<br>bindingType=1;<br>IOP::IOR={<br>    :<br>    BIOP::ObjectLocation{<br>        carouselId=0;<br>        moduleId=2;<br>        DSM::Version={<br>            0x01, 0x00<br>        };<br>        objectKey="K1";<br>    }<br>    :<br>}:<br>objectInfo= ⟨nil⟩ |

FILE "display"

| ⟨BIOP::MessageHeader⟩ |
|---|
| objectKey="K1";<br>objectKind="fil";<br>objectInfo= ⟨nil⟩<br>ServiceContextList; |
| {:Scene     ("~/display"0)<br>    :Itams{<br>        :<br>    }<br>    :InputEventRag1<br>    :SceneCS 640 480<br>} |

FILE "bitmap"

| ⟨BIOP::MessageHeader⟩ |
|---|
| objectKey="K2";<br>objectKind="fil";<br>objectInfo= ⟨nil⟩<br>ServiceContextList; |
| ⟨BITMAP DATA⟩ |

FILE "audio"

| ⟨BIOP::MessageHeader⟩ |
|---|
| objectKey="K1";<br>objectKind="str";<br>objectInfo= ⟨nil⟩<br>ServiceContextList; |
| ⟨AUDIO DATA⟩ |

FIG. 6

| reference name | moduleId | objectKey | file name |
|---|---|---|---|
| "~" | 1 | "K0" | "root" |
| "~/display" | 1 | "K1" | "display" |
| "~/bitmap.png" | 1 | "K2" | "bitmap.png" |
| "~/media" | 2 | "K0" | "media" |
| "~/media/audio.aif" | 2 | "K1" | "audio.aif" |

FIG. 7

```
module BIOP{
     struct ModuleInfo{
          unsigned long          moduleTimeOut;
          unsigned long          blockTimeOut;
          unsigned long          minBlockTime;
          sequence <DSM::Tap, 255>     Taps;
          sequence <octet, 255>   userInfo;
     };
};
```

FIG. 8

```
BIOPModuleInfo() {
    moduleTimeOut                                    <NUMBER OF 4 BYTES>
    blockTimeOut                                     <NUMBER OF 4 BYTES>
    minBlockTime                                     <NUMBER OF 4 BYTES>
    numberOfTaps                                     <NUMBER OF 1 OR MORE OF 1 BYTE>
    DSMTap() {
        Use=0x0017
        id                                           <NUMBER OF 2 BYTES>
        association_tag                              <NUMBER OF 2 BYTES (REFER TO
                                                                       PID of module)>
    }
    NumberOfSelectorInfo=0
    for(i=0;i<numberOfTaps-1;1++){
        DSMTap() {
            use                                      <NUMBER OF 2 BYTES>
            Id                                       <NUMBER OF 2 BYTES>
            association_tag                          <NUMBER OF 2 BYTES>
            numberOfSelectorInfo                     <NUMBER OF 1 BYTE>
            for(j=0;j<numberOfSelectorInfo;j++) {
                selectorInfoByte                     <NUMBER OF 1 BYTE>
            }
        }
    };
    numberOfUserInfo                                 <NUMBER OF 1 BYTE>
    for(i=0;1<numberOfUserInfo;1++) {
        userInfoByte                                 <NUMBER OF 1 BYTE>
    }
};
```

FIG. 9

```
directDictionaryInfo() {
  numberOfEntry                                    <NUMBER OF 1 BYTE>
  for(i=0;i <numberOfEntry;i++) {
    directoryEntry() {
      numberOfFullnameChar                         <NUMBER OF 1 BYTE>
      for(j=0;j <numberOfFullnameChar;j++) {
        fullnameChar                               <NUMBER OF 1 BYTE>
      }
      objectKeylength
      for(j=0;j <objectKeylength;j++) {
        objectKeyData                              <NUMBER OF 1 BYTE>
      }
    }
  }
};
```

FIG. 10

```
BIOPModuleInfo () {
    moduleTimeOut           <NUMBER OF 4 BYTES>
    blockTimeOut            <NUMBER OF 4 BYTES>
    minBlockTime            <NUMBER OF 4 BYTES>
    numberOfTaps            0x01
    DSMTap () {
        Use                 0x0017
        id                                      <NUMBER OF 2 BYTES>
        association_tag                         <NUMBER OF 2 BYTES (REFER TO
                                                         PID of module)>
    }
        NumberOfSelectorInfo        0x00 numberOfUserInfo                            <NUMBER OF 1 BYTE/
                                                 NUMBER OF BYTES OF directoryInfo ()>
    directoryInfo ()

```
moduleID                0x0001
moduleSize              0x0000010E
moduleVersion           0x00
moduleInfoLength        0x33
BIOPModuleInfo () {
        ModuleTimeOut           0xFFFFFFFF
        BlockTimeOut            0xFFFFFFFF
        MinBlockTime            0x000003E8
        NumberOfTaps            0x01
        DSMTTap () {
                Use                     0x0017
                Id                      0x0000
                association_tag         0x0100
                NumberOfSelectorInfo    0x00
        }
        userInfoLength          0x1F
        directDictionaryInfo () {
                numberOfEntry                   0x02
                directoryEntry () [0] {
                        numberOfFullnameChar    0x09
                        fullnameChar            "~/display"
                        objectKeylength         0x02
                        objectKeyData           "K1"
                }
                directoryEntry () [1] {
                        numberOfFullnameChar    0x0C
                        fullnameChar            "~/bitmap.png"
                        objectKeylength         0x02
                        objectKeyData           "K2"
                }
        }
}
```

FIG. 12

```
moduleID                0x0002
moduleSize              0x00080000
moduleVersion           0x00
moduleInfoLength        0x35
BIOPModuleInfo () {
        ModuleTimeOut           0xFFFFFFFF
        BlockTimeOut            0xFFFFFFFF
        MinBlockTime            0x000003E8
        NumberOfTaps            0x01
        DSMTap () {
                Use                     0x0017
                Id                      0x0000
                association_tag         0x0100
                NumberOfSelectorInfo    0x00
        }
        userInfoLength          0x21
        directDictionaryInfo () {
                numberOfEntry                   0x02
                directoryEntry () [0] {
                        numberOfFullnameChar    0x09
                        fullnameChar            "~/media"
                        objectKeylength         0x02
                        objectKeyData           "K0"
                }
                directoryEntry () [1] {
                        numberOfFullnameChar    0x0C
                        fullnameChar            "~/media/audio.alf"
                        objectKeylength         0x02
                        objectKeyData           "K1"
                }
        }
}
```

FIG. 13

```
DownloadInfoIndication () {
        dsmccMessageHeader () {
                protocolDiscriminator      0x11
                dsmccType                  0x03
                meccageID                  0x1002
                transactionID             0x00000000
                reserved                   0xFF
                adaptionLength             0x00
                messageLength              0x0400
        }
        downloadID                  0x10203040
        blockSize                   0x0100
        windowSize                  0x00
        ackPeriod                   0x00
        tCDownloadWindow            0x00000000
        tCDownloadScenario          0xFFFFFFFF compatibilityDescriptor () {
                compatibilityDescriptorLength0x0000
        } numberOfModule              0x0002
                <DATA IN FIG. 5>
                <DATA IN FIG. 6>
        privateDataLength           0x0000
```

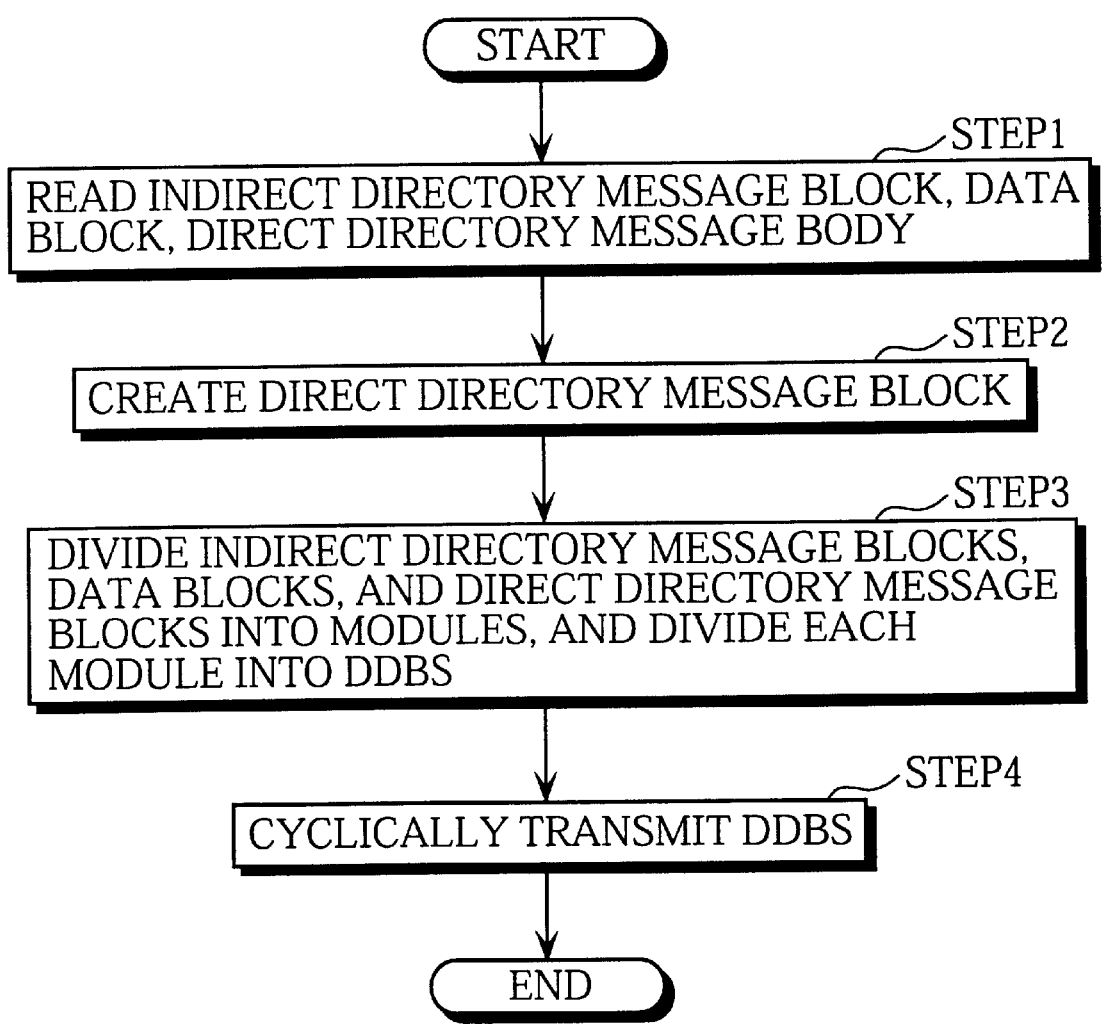

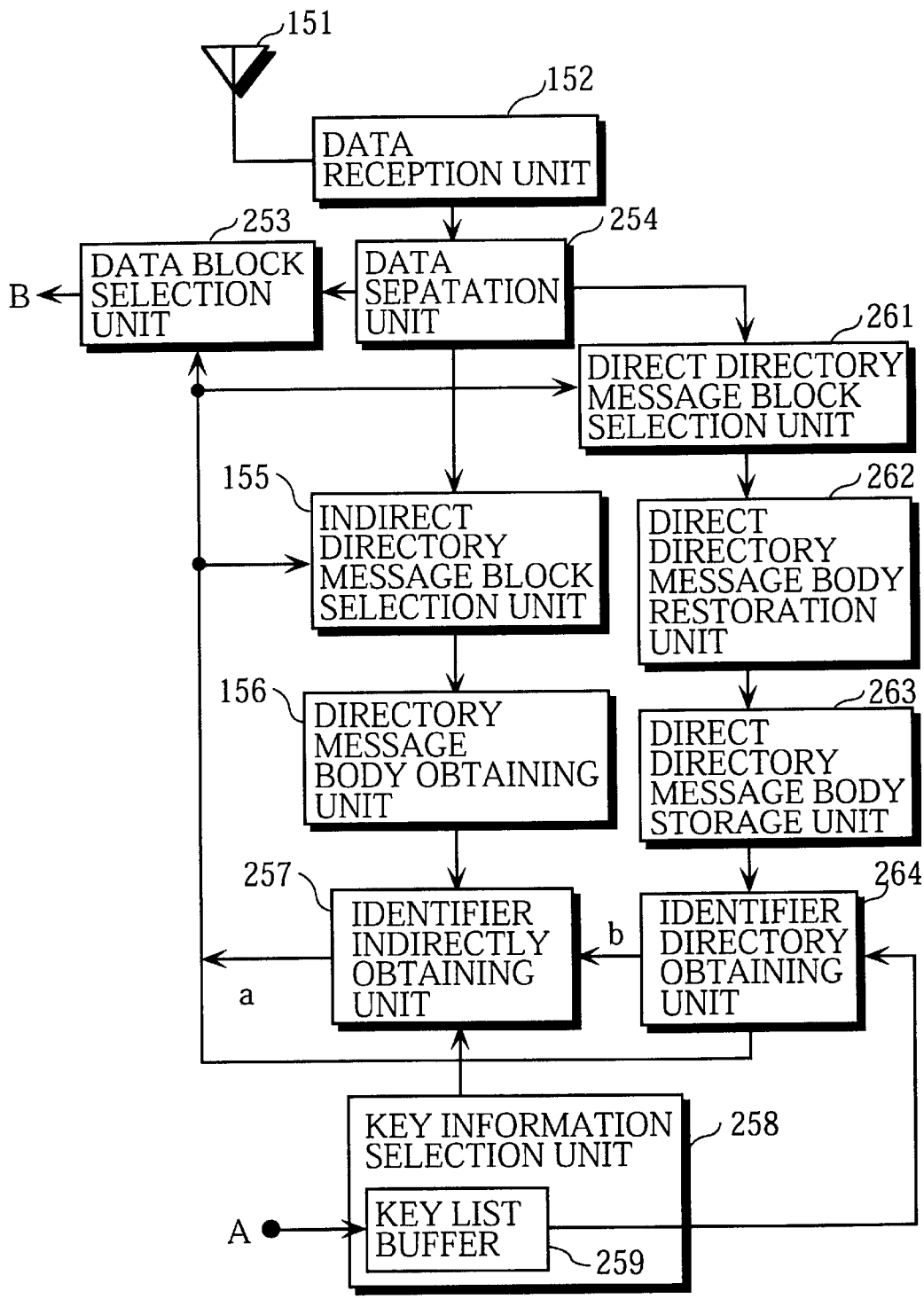

FIG. 20

```
module BIOP{
      struct DIcEntry{
            NameComponent            fullName;
            sequence <octet, 255>    objectKey;
      };

typedefsequence <DicEntry, 255>   directDictionary;
};
```

FIG. 21

ServiceGateway OBJECT

⟨BIOP::MessageHeader⟩
objectKey='K0';
objectKind='srg';
objectInfo= ⟨nil⟩
ServiceContextList;

bindingName= {
        'display', 'DSM::File'
};
bindingType=1;
IOP::IOR= {
        :
        BIOP::ObjectLocation{
                carouselId=0;
                moduleId=1;
                DSM::Version= {
                        0x01, 0x00
                };
                objectKey='K1';
        }
        :
};
objectInfo=BIOP::directDictionary{
        BIOP::DicEntry[0] {
                fullName='~/display';
                objectKey='K1'
        };
        BIOP::DicEntry[1] {
                fullName='~/bitmap.png';
                objectKey='K2'
        };
};

bindingName= {
        'bitmap.png', 'DSM::File'
};
bindingType=1;
IOP::IOR= {
        :
        BIOP::ObjectLocation{
                carouselId=0;
                moduleId=1;
                DSM::Version= {
                        0x01, 0x00
                };
                objectKey='K2';
        }
        :
};
objectInfo= ⟨nil⟩ :

bindingName= {
        'media', 'DSM::Directory'
};
bindingType=2;
IOP::IOR= {
        :
        BIOP::ObjectLocation{
                carouselId=0;
                moduleId=2;
                DSM::Version= {
                        0x01, 0x00
                };
                objectKey='K0';
        }
        :
};
objectInfo= ⟨nil⟩ :
};

FIG. 22

DIRECTORY OBJECT "media"

⟨BIOP::MessageHeader⟩ objectKey="K0";
objectKind="dir";
objectInfo= ⟨nil⟩
ServiceContextList;

```
bindingName= {
        "audio.aif", "DSM::Stream"
};
bindingType=1;
IOP::IOR= {
        :
        BIOP::ObjectLocation {
                carouselId=0;
                moduleId=2;
                DSM::Version= {
                        0x01, 0x00
                };
                objectKey="K1";
        }
        :
};
objectInfo=BIOP::directDictionary {
        BIOP::DicEntry[0] {
                fullName="~/media";
                objectKey="K0"
        };
        BIOP::DicEntry[1] {
                fullName="~/media/audio.aif";
                objectKey="K1"
        };
};
```

FIG. 28

```
module BIOP{
    typedef string <255>            Istring;
    struct NameComponent{
            Istring  id;
            Istring  Kind;
    };

typedef sequence <NameComponent, 255>        Name;

typedef octet BindingType;
    const BindingType nobject=1;
    const BindingType ncontext=2;
    const BindingType composite=3;

struct Binding{
            Name                              bindingName;
            octet                             bindingType;
            IOP::IOR                          objectRef;
            sequence <octet, 655335>          objectInfo;
    };
    typedef sequence <Binding, 65535>        DirectoryMessageBody;

```
module BIOP{
        typedef sequence <octet>    FileMessageBody;
}:
```

FIG. 30

```
module IOP{
    typedef unsigned long    ProfileId;
    const ProfileId    TAG_INTERNET_IOP=0;
    const ProfileId    TAG_MULTIPLE_COMPONENT=1;

struct TaggedProfile{
        ProfileId    tag,
        sequence <octet> profile_data;
    };

struct IOR{
        string    type_id;
        sequence <TaggedProfile>    taggedProfileList;
    };

typedef unsigned long    CompanentId;
    struct TaggedComponent{
        ComponentId    tag,
        sequence <octet> component_data;
    };
    typedef sequence <TaggedComponent> MultipleComponentProfile;

```
module DSM{
    const IOP::ProfileId    TAG_BIOP=0x49534F06;
}:

module BIOP{
    const IOP::ComponentId  TAG_ObjectLocation=0x49534F50;

struct ObjectLocation{
        unsigned long           carouselId;
        unsigned short          moduleId;
        DSM::Version            version;
        sequence <octet, 255>   objectKey;
    }:
}:
```

DATA TRANSMISSION APPARATUS AND DATA RECEPTION APPARATUS

FIELD OF THE INVENTION

The present invention relates to a data transmission apparatus and a data reception apparatus that transmits and receives a data file having a directory structure, and especially relates to a method of effective transmission and reception of a plurality of data files that are to be used simultaneously or successively.

BACKGROUND OF THE INVENTION

FIG. 26 is a schematic diagram of a data transmission/reception system.

The data transmission/reception system shown in FIG. 26 includes a broadcasting station 901, a broadcasting satellite 902, a portable terminal 903, and a tabletop terminal 904.

Digital data in which a variety of kinds of data such as video, audio, and program information are multiplexed is transmitted over a broadcast wave from the broadcasting station 901. The broadcast wave carrying digital data is relayed by the broadcasting satellite 902 and received by the portable terminal 903 and the tabletop terminal 904. From the received broadcast wave, desired data is extracted and used.

At present MPEG 2 (Moving Picture Coding Experts Group 2) transport stream is mainly used in the data transmission/reception system.

The MPEG 2 is standardized by the ISO/ICE13181. The object carousel (DSM-CC) standardized by the ISO/ICE 13181Extensions for DSM-CC defines the control protocol of data download.

The DSM-CC standard defines a flow control method and a non-flow control method. According to the flow control method, control information is efficiently transmitted and received. As a result, the flow control method is suitable for local data transmission and reception but not suitable for digital broadcasting data transmission and reception, by which the same data is transmitted to many receivers at one time. On the other hand, according to the non-flow control method, control information does not transmitted from a receiver to a sender, so that the non-flow control method is suitable for the data transmission and reception as digital broadcasting.

The non-flow control method defined by the DSM-CC standard includes an data carousel transmission method (DSM-CC-UN) and an object carousel transmission method (DSM-CC-UU). Here the data carousel transmission method includes the object carousel transmission method.

In the data carousel transmission method, data to be transmitted is cyclically transmitted from the sender, and the receiver starts receiving data with almost no wait. Note that the data carousel transmission method is described in chapters 1 to 3 and 7 of ISO/ICE13181-6 in detail.

The object carousel transmission method is a data carousel transmission system in which the standard is expanded as described below so that a file having a directory structure is transmitted.

1. Definition of BIOP Message

Data to be transmitted is independent by the module. Each of the modules is composed of a plurality of BIOP messages.

FIG. 27 shows a module composed of a plurality of BIOP messages.

Four different object types, i.e., directory object, file object, stream object, and service gateway (SGW), are defined as the BIOP message. A directory object includes the name of another object directly relating to the directory corresponding to the directory object and the identifier identifies the BIOP message corresponding to the object name. A file object includes file data or bitmap data. A stream object includes the reference to stream data that is transmitted by broadcasting. It can be safely said that a service gateway is the same as a directory object and is a particular directory object that represents the root of a directory structure.

In this specification, the service gateway is considered a kind of directory object and the stream object is considered a kind of file object in the interest of simplicity of the explanation of the present invention.

FIG. 28 shows the definition of directory object.

FIG. 29 shows the definition of file object.

2. Definition of IOP::IOR

FIG. 30 shows the definition of IOP::IOR.

A BIOP message includes an identifier IOP::IOR (referred to an "identifier IOR" in this specification) of a download ID, a module ID, and an object key in its own header. Each of the BIOP messages is identified by the identifier IOR on the receiver side.

FIG. 31 shows the definition of BIOP::Object Location, which is an important element of the identifier IOR in the object carousel transmission method.

FIG. 32 is a schematic diagram of a conventional method for referring to a file message according to the name of the file (a key list) in the object carousel transmission method.

Note that the data carousel transmission method is described in chapters 2, 7, and 9 of ISO/ICE 13181-6, and the object carousel transmission method is described in chapters 4, 5, and 11 of ISO/ICE13181-6.

Showing existing standards, FIGS. 26 to 32 are not explained in detail in this specification.

[Conventional Transmission Apparatus]

FIG. 33 shows the structure of a conventional transmission apparatus for transmitting files having directory structures according to the object carousel transmission method.

A transmission apparatus 100 in FIG. 33 includes an indirect directory message block storage unit 101, an indirect directory message block reading unit 102, a data block storage unit 103, a data block reading unit 104, a multiplexing unit 105, a data transmission unit 106, and an antenna 107.

The indirect directory message block storage unit 101 stores indirect directory message blocks. Note that an indirect directory message block shows the names of the directories and files that directly relate to a directory in the file structure.

The indirect directory message block reading unit 102 reads indirect directory message blocks from the indirect directory message block storage unit 101.

The data block storage unit 103 stores data blocks. Here, one data block includes one file.

The data block reading unit 104 reads data blocks from the data block storage unit 103.

The multiplexing unit 105 multiplexes the read indirect directory message blocks and the read data blocks into digital stream data. More specifically, the multiplexing unit 105 groups the read indirect directory message blocks and the read data blocks into a plurality of modules, gives a different module identifier to each of the modules, gives different object keys to the indirect directory message blocks and data blocks in one module, and divides each of the modules into DDBs, i.e., units of transmission.

The data transmission unit 106 broadcasts the digital stream data according to the object carousel transmission method via the antenna 107.

[Conventional Reception Apparatus]

FIG. 34 shows the structure of a conventional reception apparatus that receives files having directory structures according to the object carousel method.

A reception apparatus 150 shown in FIG. 34 includes a reception antenna 151, a data reception unit 152, a data block selection unit 153, a data separation unit 154, an indirect directory message block selection unit 155, a directory message body obtaining unit 156, an identifier indirect obtaining unit 157, and a key information selection unit 158.

The data reception unit 152 receives data in the object carousel transmission method that is being broadcasted via the reception antenna 151, and restores digital stream data.

The data separation unit 154 extracts indirect directory message blocks and data blocks from the digital stream data. The data separation unit 154 outputs the indirect directory message blocks to the indirect directory message block selection unit 155 and outputs the data blocks to the data block selection unit 154.

The key information selection unit 158 includes a key list buffer 159 for temporarily storing a reference name that is input from a terminal "A". The key information selection unit 158 selects directory names and file names (keys) according to the name of the reference name that the key list buffer 159 stores, and outputs the selected directory names and file names to the identifier indirect obtaining unit 157. For instance, when the reference name is "~/abc/def/ghi", the key information selection unit 158 selects four keys, in the order of "~", "abc", "def", and "ghi". Note that a "~" represents an "SGW(ServiceGateway)", i.e., the root of a directory structure and a "/" represents the difference of levels.

The identifier indirect obtaining unit 157 selects an identifier IOR relating to the key that the key information selection unit 158 has output from the indirect directory message body that the directory message body obtaining unit 156 has output, and outputs the identifier IOR to the indirect directory message block selection unit 155 and the data block selection unit 154. Here, when the key is "~", no indirect directory message body has been output, so that the identifier IOR of the SGW is selected according to a method that is separately defined. Note that the method for selecting the identifier IOR of the SGW has no particular bearing on the principle of the present invention, so that the selection method is not explained.

The indirect directory message block selection unit 155 selects the directory object corresponding to the identifier IOR that the identifier indirect obtaining unit 157 has output from the indirect directory message blocks that the data separation unit 154 has output, and outputs the directory object to the directory message body obtaining unit 156.

The directory message body obtaining unit 156 obtains a BIOP::indirect Directory Message Body in which partial reference names correspond to different identifiers IOR from the directory object, and outputs the BIOP::Directory Message Body to the identifier indirect obtaining unit 157.

The data block selection Unit 153 selects a file object corresponding to the identifier IOR that the identifier indirect obtaining unit 157 has output from the data blocks that the data separation unit 154 has output, and outputs the selected file object from a terminal "B".

The reception apparatus 150 repeats the foregoing process every time a reference name is input from the terminal "A" until a file object is output from the terminal "B" or the processes for all the keys are completed.

As has been described, in the conventional way of receiving files having directory structures according to the carousel transmission method, it is necessary to repeat the reception of an indirect directory message block and the selection of a directory object the number of times of the directories in order to trace directories until the reception of a target object. As a result, the process is complicated and the period of time required to receive the target object is relatively long. In addition, data is repeatedly transmitted in cycle and the next cycle may be waited for in the process, so that the period of time required to receive the target object may be much longer and unstable.

One solution is proposed to shorten the receiving time. A plurality of data files that are likely to be received in succession (referred to "simultaneously-used-files" in this specification) is transmitted in the same module, and the plurality of simultaneously-used-files are stored in a cache memory with the module when the module is reproduced to shorten the period of time from the reception of one data file to the reception of simultaneously-used-files.

FIG. 35 shows examples of transmitting simultaneously-used-files in one module.

In this method, however, directories still need to be traced. In addition, even when no simultaneously-used-file is stored in a cache memory, the data in the cache memory needs to be kept until the end of the tracing, so that the cache memory is not used effectively.

It is accordingly an object of the present invention to provide a data transmission apparatus, a data reception apparatus, a data transmission method, and a data reception method that effectively transmit and receive a plurality of data files having directory structures to be simultaneously or successively used, a recording medium that stores the data transmission method, and the data reception method, and a recording medium that stores transmission and reception data.

DISCLOSURE OF THE INVENTION

The data reception apparatus according to the present invention is a data reception apparatus that receives a file system having a directory structure and obtains a data file corresponding to a reference name starting from a predetermined directory name, wherein a data block includes a data file and an identifier of the data block, the data reception apparatus that may include: a storage unit for storing a direct directory message body that is used for directly specifying an identifier of a data block corresponding to a reference name according to the reference name; a reference name obtaining unit for obtaining a reference name of a data file to be obtained; a reception unit for receiving multiplexed data into which a plurality of indirect directory message blocks, a plurality of data blocks, and data of at least one direct directory message body have been multiplexed, an indirect directory message block includes an identifier of the indirect directory message block and an indirect directory message body that is used for specifying an identifier of a data block corresponding to a data file in a first directory according to a name of the data file and is used for specifying an identifier of an indirect directory message block corresponding to a second directory in the first directory according to a name of the second directory for each directory; a separation unit for extracting indirect directory message blocks, data blocks, and data of direct directory message body from the received multiplexed data and outputting the extracted indirect directory message blocks, data blocks, and direct directory message body data; a direct reference unit for outputting, when the direct directory message body stored by the storage unit includes the reference name that the reference name obtaining unit has obtained, a data block identifier that is directly specified according to the reference name according to the direct directory message body; a key information creation unit for separating, when the direct directory message body stored by the storage unit does not include the reference name that the reference name obtaining unit has obtained, a directory name and a file name in the reference name to create key information, and outputting the created key information; an indirect reference unit for outputting, when key information output by the key information creation unit is a predetermined directory name, an identifier of an indirect directory message block of the predetermined directory name; an indirect directory message block selection unit for selecting an indirect directory message block corresponding to the key information from the indirect directory message blocks that the separation unit has output according to the indirect directory message block identifier that the indirect reference unit has output; an indirect directory message body extraction unit for extracting an indirect directory message body from the selected indirect directory message block, wherein when the key information that has been output by the key information creation unit is not a predetermined directory name, the indirect reference unit repeatedly retrieves an identifier corresponding to the key information from the indirect directory message body that the indirect directory message body extraction unit has extracted and outputs the retrieved identifier until a data block identifier is retrieved; a data block selection unit for selecting a data block corresponding to the key information from the data blocks that the separation unit has output according to an identifier that one of the direct reference unit and the indirect reference unit has output and extracting a data file from the selected data block; a direct directory message body selection unit for selecting data of a direct directory message body corresponding to the data block from the data of direct directory message body that the separation unit has output; and an updating unit for storing the selected direct directory message body data in the storage unit.

As a result, when a direct directory message body includes a reference name, the identifier of a data block may be directly identified by the reference name, and when a direct directory message body includes no reference name, the identifier of a data block may be identified by tracing indirect directory message bodies and the direct directory message body may be obtained and stored for the data block that is to be selected later.

Since the direct directory message body for the second data block is stored when the first data block is selected, the identifier of the second data block may be identified directly by the reference name without tracing indirect directory message bodies when the second data block is selected. As a result, the period of time required for reception is shortened.

The data reception apparatus according to the present invention may also be the data reception apparatus, wherein the reception unit receives multiplexed data into which information in a process before selection of the data block and direct directory message body data corresponding to the data block have been multiplexed, and the direct directory message body selection unit selects the direct directory message body data corresponding to the data block in the process before selection of the data block.

As a result, the direct directory message body for the second data block may be obtained in the process of selecting the first data block, so that the amount of work in the process of obtaining the direct directory message body data is reduced.

The data reception apparatus according to the present invention may also be the data reception apparatus, wherein direct directory message body data corresponding to a first data block is information that has been multiplexed into information in a process of selecting the first data block and directly specifies an identifier of a second data block according to a reference name of the second data block that is expected to be successively selected after a selection of the first data block.

As a result, the direct directory message body data for the second data block may be obtained in the process of selecting the first data block The data reception apparatus according to the present invention may also be the data reception apparatus, wherein the direct directory message body data corresponding to the first data block for a module is multiplexed into a stream that transmits the reproduction information for the module including the first data block, and when receiving the stream that transmits the reproduction information, the direct directory message body selection unit selects direct directory message body data corresponding to the module from the stream.

As a result, the direct directory message body data for the second data block may be obtained when the stream transmitting the reproduction information of the first data block is received.

The data reception apparatus according to the present invention may also be the data reception apparatus, wherein the direct directory message body data corresponding to the first data block is multiplexed into the indirect directory message block that has been selected by the indirect directory message block selection unit when the first data block is selected, and the direct directory message body selection unit selects direct directory message body data from the indirect directory message block that the indirect directory message block selection unit has selected.

As a result, the direct directory message body data for the second data block may be obtained when an indirect directory block is selected for selecting the first data block.

The data transmission apparatus according to the present invention is a data transmission apparatus that transmits a file system having a directory structure that may include: an obtaining unit for obtaining a plurality of indirect directory message blocks, a plurality of data blocks, and at least one direct directory message body, an indirect directory message block includes an identifier of the indirect directory message block and an indirect directory message body that is used for specifying an identifier of a data block corresponding to a data file in a first directory according to a name of the data file and is used for specifying an identifier of an indirect directory message block corresponding to a second directory in the first directory according to a name of the second directory for each directory, a data block includes an identifier of the data block and a data file, a direct directory message body is used to directly specify an identifier of a data block corresponding to a reference name starting from a predetermined directory name; a multiplexing unit for multiplexing the obtained indirect directory message blocks, the obtained data blocks, and data of the obtained direct directory message body, and creating multiplexed data; and a transmission unit for transmitting the created multiplexed data.

The data transmission apparatus transmits multiplexed data into which a direct directory message body has been multiplexed is transmitted, so that the identifier of a data block may be directly identified by a reference name in a data transmission apparatus that receives the multiplexed data.

As a result, the period of time required for transmission and reception is shortened.

The data transmission apparatus according to the present invention may also be the data transmission apparatus, wherein a direct directory message body is information that is used to directly specify an identifier of a data block corresponding to a reference name of a data file according to the reference name for each of a plurality of data files that are expected to be simultaneously or successively obtained.

As a result, in the data reception apparatus, the identifiers of the corresponding data blocks may be directly identified by the reference names of a plurality of data files that are expected to be simultaneously or successively obtained, so that the identifiers of the data blocks that are expected to be simultaneously or successively obtained may be identified once a direct directory message body is obtained.

The data transmission apparatus according to the present invention may also be the data transmission apparatus, wherein the multiplexing unit multiplexes direct directory message body data into information used for specifying a data block represented by a reference name in the direct directory message body for each reference name in the direct directory message body.

As a result, in the data reception apparatus, the direct directory message body data for the second data block may be obtained in the process of selecting the first data block, so that the amount of work in the process of obtaining the direct directory message body data is reduced.

The data transmission apparatus according to the present invention may also be the data transmission apparatus, wherein the multiplexing unit multiplexes direct directory message body data into a stream used for specifying a module represented by an identifier in the direct directory message body.

As a result, in the data reception apparatus, the direct directory message body data for the second data block may be obtained from the stream that has been reproduced in the process of selecting the first data block, so that the amount of work in the process of obtaining the direct directory message body data is reduced.

The data transmission apparatus according to the present invention may also be the data transmission apparatus, wherein the multiplexing unit multiplexes direct directory message body data into indirect directory message blocks used for specifying a data block represented by a reference name in the direct directory message body for each reference name in the direct directory message body.

As a result, in the data reception apparatus, the direct directory message body data for the second data block may be obtained from the indirect directory message blocks that have been obtained in the process of selecting the first data block, so that the amount of work in the process of obtaining the direct directory message body data is reduced.

The data reception method according to the present invention is a data reception method for receiving a file system having a directory structure and obtaining a data file corresponding to a reference name starting from a predetermined directory name in a data reception apparatus that includes storage unit for storing a direct directory message body used for directly specifying an identifier of a data block corresponding to the reference name according to the reference name, a data block includes a data file and an identifier of the data block, the data reception method may include: a reference name obtaining step for obtaining a reference name of a data file to be obtained; a reception step for receiving multiplexed data into which a plurality of indirect directory message blocks, a plurality of data blocks, and data of at least one direct directory message body have been multiplexed, an indirect directory message block includes an identifier of the indirect directory message block and an indirect directory message body that is used for specifying an identifier of a data block corresponding to a data file in a first directory according to a name of the data file and is used for specifying an identifier of an indirect directory message block corresponding to a second directory in the first directory according to a name of the second directory for each directory; a separation step for extracting indirect directory message blocks, data blocks, and data of direct directory message body from the received multiplexed data and outputting the extracted indirect directory message blocks, data blocks, and direct directory message body data; a direct reference step for outputting, when the direct directory message body stored in the storage unit includes the reference name that has been obtained at the reference name obtaining step, a data block identifier that is directly specified according to the reference name according to the direct directory message body; a key information creation step for separating, when the direct directory message body stored in the storage unit does not include the reference name that has been obtained at the reference name obtaining step, a directory name and a file name in the reference name to create key information, and outputting the created key information; an indirect reference step for outputting, when key information output at the key information creation step is a predetermined directory name, an identifier of an indirect directory message block of the predetermined directory name; an indirect directory message block selection step for selecting an indirect directory message block corresponding to the key information from the indirect directory message blocks that has been output at the separation step according to the indirect directory message block identifier that has been output at the indirect reference step; an indirect directory message body extraction step for extracting an indirect directory message body from the selected indirect directory message block, wherein when the key information that has been output at the key information creation step is not a predetermined directory name, an identifier corresponding to the key information is repeatedly retrieved from the indirect directory message body that has been extracted at the indirect directory message body extraction step and the retrieved identifier is output until a data block identifier is retrieved at the indirect reference step; a data block selection step for selecting a data block corresponding to the key information from the data blocks that has been output at the separation step according to an identifier that has been output at one of the direct reference step and the indirect reference step and extracting a data file from the selected data block; a direct directory message body selection step for selecting data of a direct directory message body corresponding to the data block from the data of direct directory message body that has been output at the separation step; and an updating step for storing the selected direct directory message body data at the storage step.

As a result, when a direct directory message body includes a reference name, the identifier of a data block may be directly identified by the reference name, and when a direct directory message body includes no reference name, the identifier of a data block may be identified by tracing indirect directory message bodies and the direct directory message body may be obtained and stored for the data block that is to be selected later.

Since the direct directory message body for the second data block is stored when the first data block is selected, the identifier of the second data block may be identified directly by the reference name without tracing indirect directory message bodies when the second data block is selected. As a result, the period of time required for reception is shortened.

The data transmission method according to the present invention is a data transmission method for transmitting a file system having a directory structure that may include: an obtaining step for obtaining a plurality of indirect directory message blocks, a plurality of data blocks, and at least one direct directory message body, an indirect directory message block includes an identifier of the indirect directory message block and an indirect directory message body that is used for specifying an identifier of a data block corresponding to a data file in a first directory according to a name of the data file and is used for specifying an identifier of an indirect directory message block corresponding to a second directory in the first directory according to a name of the second directory for each directory, a data block includes an identifier of the data block and a data file, a direct directory message body is used to directly specify an identifier of a data block corresponding to a reference name starting from a predetermined directory name; a multiplexing step for multiplexing the obtained indirect directory message blocks, the obtained data blocks, and data of the obtained direct directory message body, and creating multiplexed data; and a transmission step for transmitting the created multiplexed data.

The data transmission apparatus transmits multiplexed data into which a direct directory message body has been multiplexed is transmitted, so that the identifier of a data block may be directly identified by a reference name in a data transmission apparatus that receives the multiplexed data.

As a result, the period of time required for transmission and reception is shortened.

The computer-readable recording medium according to the present invention that records a data reception program is a computer-readable recording medium that records a data reception program for receiving a file system having a directory structure and for obtaining a data file corresponding to a reference name starting from a predetermined directory name in a data reception apparatus that includes storage unit for storing a direct directory message body directly specifying an identifier of a data block corresponding to the reference name according to the reference name, a data block includes a data file and an identifier of the data block, the data reception program has a computer execute steps that may include: a reference name obtaining step for obtaining a reference name of a data file to be obtained; a reception step for receiving multiplexed data into which a plurality of indirect directory message blocks, a plurality of data blocks, and data of at least one direct directory message body have been multiplexed, an indirect directory message block includes an identifier of the indirect directory message block and an indirect directory message body that is used for specifying an identifier of a data block corresponding to a data file in a first directory according to a name of the data file and is used for specifying an identifier of an indirect directory message block corresponding to a second directory in the first directory according to a name of the second directory for each directory; a separation step for extracting indirect directory message blocks, data blocks, and data of direct directory message body from the received multiplexed data and outputting the extracted indirect directory message blocks, data blocks, and direct directory message body data; a direct reference step for outputting, when the direct directory message body stored in the storage unit includes the reference name that has been obtained at the reference name obtaining step, a data block identifier that is directly specified according to the reference name according to the direct directory message body; a key information creation step for separating, when the direct directory message body stored in the storage unit does not include the reference name that has been obtained at the reference name obtaining step, a directory name and a file name in the reference name to create key information, and outputting the created key information; an indirect reference step for outputting, when key information output at the key information creation step is a predetermined directory name, an identifier of an indirect directory message block of the predetermined directory name; an indirect directory message block selection step for selecting an indirect directory message block corresponding to the key information from the indirect directory message blocks that has been output at the separation step according to the indirect directory message block identifier that has been output at the indirect reference step; an indirect directory message body extraction step for extracting an indirect directory message body from the selected indirect directory message block, wherein when the key information that has been output at the key information creation step is not a predetermined directory name, an identifier corresponding to the key information is repeatedly retrieved from the indirect directory message body that has been extracted at the indirect directory message body extraction step and the retrieved identifier is output until a data block identifier is retrieved at the indirect reference step; a data block selection step for selecting a data block corresponding to the key information from the data blocks that has been output at the separation step according to an identifier that has been output at one of the direct reference step and the indirect reference step and extracting a data file from the selected data block; a direct directory message body selection step for selecting data of a direct directory message body corresponding to the data block from the data of direct directory message body that has been output at the separation step; and an updating step for storing the selected direct directory message body data at the storage step.

As a result, the same effect as the data reception method may be obtained.

The computer-readable recording medium according to the present invention that records a data transmission program is a computer-readable recording medium that records a data transmission program for transmitting a file system having a directory structure, the data transmission program has a computer execute steps that may include: an obtaining step for obtaining a plurality of indirect directory message blocks, a plurality of data blocks, and at least one direct directory message body, an indirect directory message block includes an identifier of the indirect directory message block and an indirect directory message body that is used for specifying an identifier of a data block corresponding to a data file in a first directory according to a name of the data file and is used for specifying an identifier of an indirect directory message block corresponding to a second directory in the first directory according to a name of the second directory for each directory a data block includes an identifier of the data block and a data file, a direct directory message body is used to directly specify an identifier of a data block corresponding to a reference name starting from a predetermined directory name; a multiplexing step for multiplexing the obtained indirect directory message blocks, the obtained data blocks, and data of the obtained direct directory message body, and creating multiplexed data; and a transmission step for transmitting the created multiplexed data.

As a result, the same effect as the data transmission method may be obtained.

The computer-readable recording medium according to the present invention that records transmission and reception data is a computer-readable recording medium that records transmission and reception data for transmitting and receiving a file system having a directory structure, the transmission and reception data being characterized by multiplexing of (1) a plurality of indirect directory message blocks, an indirect directory message block includes an identifier of the indirect directory message block and an indirect directory message body that is used for specifying an identifier of a data block corresponding to a data file in a first directory according to a name of the data file and is used for specifying an identifier of an indirect directory message block corresponding to a second directory in the first directory according to a name of the second directory for each directory; (2) a plurality of data blocks, a data block includes a data file and an identifier of the data block; and (3) data of at least one direct directory message body that is information used for directly specifying an identifier of a data block corresponding to a reference name starting from a predetermined directory name according to the reference name into the transmission and reception data.

A direct directory message body has been multiplexed into the transmission and reception data, so that the identifier of a data block may be directly identified by a reference name in a data reception apparatus that receives the transmission and reception data.

As a result, the period of time required for transmission and reception is shortened.

The computer-readable recording medium according to the present invention that records transmission and reception data may also be the computer-readable recording medium, wherein direct directory message body data is information that has been multiplexed into information used for specifying the first data block and directly specifies an identifier of a second data block according to a reference name of the second data block that is expected to be successively selected after a selection of the first data block.

The direct directory message body data is multiplexed into information used for identifying the first data block, so that the direct directory message body data may be obtained for the second data block in the process of selecting the first data block in a data reception apparatus that receives the transmission and reception data. As a result, the amount of work in the process of obtaining the direct directory message body data is reduced.

BRIEF DESCRIPTION OF THE DRAWINGS

These and other objects, advantages and features of the invention will become apparent from the following description thereof taken in conjunction with the accompanying drawings which illustrate a specific embodiment of the invention. In the Drawings:

FIG. 2 shows an MHEG(ISO/IEC13522-5) program;

FIG. 4 shows the contents of objects;

FIG. 5 shows the contents of objects;

FIG. 6 shows a direct directory message body stored in the direct directory message body storage unit 211;

FIG. 7 shows the definition of BIOP::ModuleInfo;

FIG. 8 shows a transmission format;

FIG. 9 shows a format "directDictionaryInfo" when the content of a direct directory message body is stored in the "userInfo";

FIG. 10 is an example of a transmission format of the BIOP::ModuleInfo into which the "directDictionaryInfo" shown in FIG. 9 has been inserted;

FIG. 11 shows a DII that has been created according to a direct directory message body;

FIG. 12 shows a DII that has been created according to a direct directory message body;

FIG. 13 shows a DII that has been created according to a direct directory message body;

FIG. 14 is a flowchart showing the processing of the digital data transmission by the transmission apparatus 200 according to the first embodiment;

FIG. 15 shows the structure of a reception apparatus according to the first embodiment of the present invention;

FIG. 20 shows the definition of the BIOP::directDictionary, which is used in storing direct directory message body data in the "objectInfo";

FIG. 21 shows a directory object into which the data of a direct directory message body shown in FIG. 6 has been inserted;

FIG. 22 shows a directory object into which the data of a direct directory message body shown in FIG. 6 has been inserted;

FIG. 28 shows the definition of directory object;

FIG. 29 shows the definition of file object;

FIG. 30 shows the definition of IOP::IOR;

FIG. 31 shows the definition of BIOP::Object Location, which is an important element of the identifier IOR in the object carousel transmission method;

DESCRIPTION OF THE PREFERRED EMBODIMENTS

The detailed explanation of the preferred embodiments of the present invention will be given below with reference to figures.

The First Embodiment

[Outline]

According to the first embodiment, when data having directory structures is transmitted and received, the transmission side inserts a direct directory message body, with which reception information is directly obtained by the reference name of a data file that is to be secondly received, into the stream in advance that is to be received in the reception process of another data file that is to be firstly received, the reception side extracts and holds the direct directory message body in the reception process of the firstly-received data file, and directly obtains reception information by the reference name by referring to the held direct directory message body without tracing directories when receiving the secondly-received data file. As a result, the period of time required to receive the files is shortened as a whole.

[Structure of Transmission Apparatus]

Figure 1:
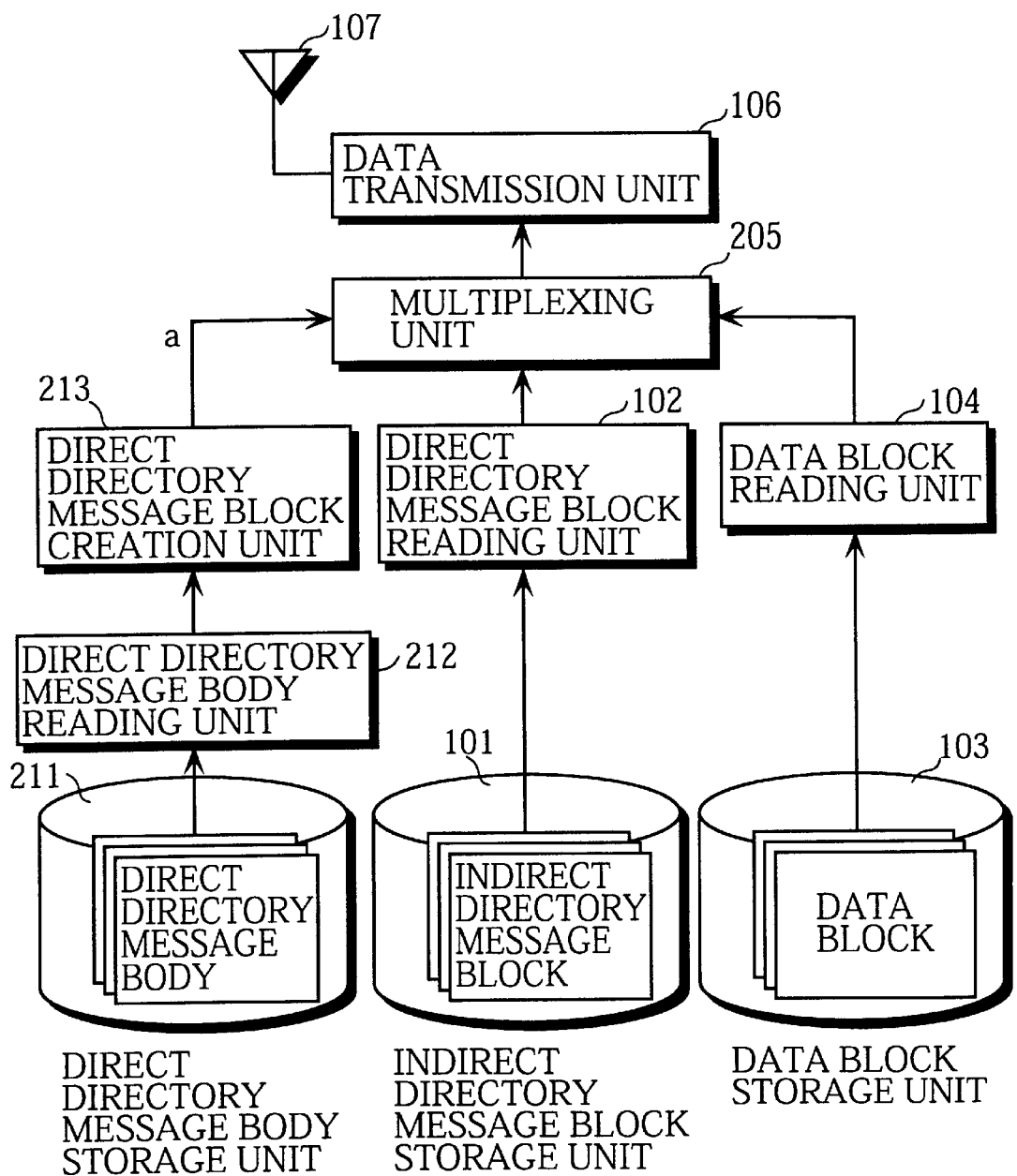
FIG. 1 shows the structure of a transmission apparatus according to the first embodiment of the present invention.

FIG. 1 shows the structure of a transmission apparatus according to the first embodiment of the present invention.

A transmission apparatus 200 shown in FIG. 1 includes an indirect directory message block storage unit 101, an indirect directory message block reading unit 102, a data block storage unit 103, a data block reading unit 104, a multiplexing unit 205, a data transmission unit 106, an antenna 107, a direct directory message body storage unit 211, a direct directory message body reading unit 212, and a direct directory message block creation unit 213.

Here, the elements having the same functions as in the conventional transmission apparatus 100 are given the same reference numbers and the explanation of these elements will not be given below.

FIG. 2 shows an MHEG(ISO/IEC13522-5) program.

Figure 3:
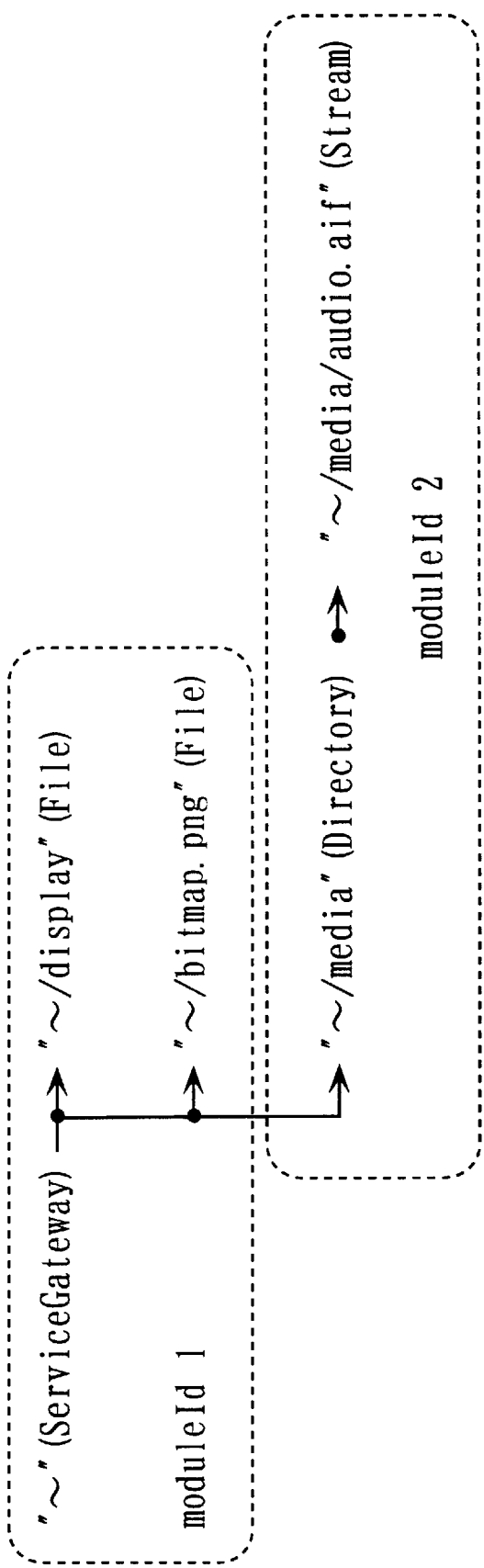
FIG. 3 shows the directory structure of three data files, "~/display", "~/bitmap.png", and "~/media/audio.aif ", which are simultaneously or successively used in the MHEG program shown in FIG. 2, an SGW, and a directory object, "~/media"

FIG. 3 shows the directory structure of three data files "~/display", "~/bitmap.png", and "~/media/audio.aif", which are simultaneously or successively used in the MHEG program shown in FIG. 2, an SGW, and a directory object "~/media".

Here, the SGW and the data files "~/display" and "~/bitmap.png" are a ModuleId1, and the data file "~/media/audio.aif" and the directory object "~/media" are a ModuleId2 as shown in FIG. 3. It is predicted that the transmission of the unit of module realizes effective reception on the reception side. Each of the modules are given a different module identification number. More specifically, the object key in each of the modules are "K0", "K1", "K2", and the like. FIGS. 4 and 5 show the contents of the objects.

The direct directory message body storage unit 211 stores direct directory message bodies.

FIG. 6 shows a direct directory message body stored in the direct directory message body storage unit 211. In a direct directory message body, module identification numbers correspond to different object keys for a data files.

The direct directory message body reading unit 212 reads a direct directory message body.

The direct directory message block creation unit 213 converts the form of the direct directory message body that the direct directory message body reading unit 212 has read, and creates a direct directory message block that may be multiplexed.

The multiplexing unit 205 multiplexes at least one indirect directory message block, data block, and direct directory message block into digital stream data. More specifically, at least one read indirect directory message block, data block, and direct directory message block are divided into a plurality of modules, and each of the modules are given a different module identification number. In one module, each of the BIOPs are given a different object key, and each of the modules is divided into DDBs, i.e., transmission units.

A detailed explanation of how a direct directory message block is created and multiplexed will be given below.

Here, part of a DII of the DSM-CC-UN is used as a direct directory message block.

According to the DSM-CC standard, a DDI is a stream for transmitting the transmission information on the modules.

An extended area ModuleInfoByte:MIB is defined in a DII, and a BIOP::ModuleInfo is defined in an MIB in the DSM-CC-UN that defines PIDs and the like for which DDB should be transmitted by module.

FIG. 7 shows the definition of BIOP::ModuleInfo. FIG. 8 shows the transmission format of the BIOP::ModuleInfo.

As shown in FIG. 7, an area released for the user "userinfo" is defined in the BIOP::ModuleInfo.

In the present embodiment, the content of a direct directory message body is stored in the "userInfo".

FIG. 9 shows a format "directDictionaryInfo" when the content of a direct directory message body is stored in the "userInfo". The "fullname" in FIG. 9 represents the "reference name" shown in FIG. 6 in the direct directory message body. As a result, the object key of a BIOP is directory obtained from the "reference name" by referring to the "directDictionaryInfo".

FIG. 10 is an example of a transmission format of the BIOP::ModuleInfo into which the "directDictionaryInfo" shown in FIG. 9 has been inserted.

FIGS. 11, 12, and 13 show DIIs that have been created according to the direct directory message body shown in FIG. 6 by the process in the present invention.

[Operations of Transmission Apparatus]

FIG. 14 is a flowchart showing the processing of the digital data transmission by the transmission apparatus 200 according to the first embodiment.

The operations by the transmission apparatus 200 will be described with reference to FIG. 14.

(1) The indirect directory message block reading unit 102 reads an indirect directory message block from the indirect directory message block storage unit 101, the data block reading unit 104 reads a data block from the data block storage unit 103, and the direct directory message body reading unit 212 reads a direct directory message body from the direct directory message body storage unit 211 (Step S1).

(2) The direct directory message block creation unit 213 creates a direct directory message block according to the read direct directory message body (Step S2).

(3) The multiplexing unit 205 divides read indirect directory message blocks, read data blocks, and created direct directory message blocks into a plurality of modules. Each of the modules is given a different identification number. In one module, each of the BIOPs are given a different object key, and each of the modules is divided into DDBs, i.e., transmission units (Step S3).

(4) The data transmission unit 106 cyclically transmits the DDBs (Step S4).

When receiving a data file, a reception apparatus does not need to trace directories. The reception apparatus only needs to refer to the direct directory message body corresponding to the received data file.

[Structure of Reception Apparatus]

FIG. 15 shows the structure of a reception apparatus according to the first embodiment of the present invention.

A reception apparatus 250 in FIG. 15 includes a reception antenna 151, a data reception unit 152, a data block selection unit 253, a data separation unit 254, an indirect directory message block selection unit 155, a directory message body obtaining unit 156, an identifier indirect obtaining unit 257, a key information selection unit 258, a direct directory message block selection unit 261, a direct directory message body restoration unit 262, a direct directory message body storage unit 263, and an identifier directly obtaining unit 264.

Here, the elements having the same functions as in the conventional reception apparatus 150 are given the same reference numbers and the explanation of these elements will not be given below.

Note that the reception apparatus 250 receives digital stream data transmitted from the transmission apparatus 200 that has been created by multiplexing at least one direct directory message blocks, indirect directory message blocks, and data blocks.

The data separation unit 254 extract an indirect directory message block, a direct directory message block, and a data block from the digital stream data, and outputs the indirect directory message block to the indirect directory message block selection unit 155, a DII including the direct directory message block to the direct directory message block selection unit, and the data block to the data block selection unit 253. Here, the direct directory message block is the "directDictionaryInfo" in an MIB in the DII.

The identifier indirect obtaining unit 257 selects the identifier IOR corresponding to a key that the key information selection unit 158 has output from the indirect directory message body that the directory message body obtaining unit 156 has output, and outputs the identifier IOR to the direct directory message block selection unit 261, the indirect directory message block selection unit 155, and the data block selection unit 253.

The direct directory message block selection unit 261 selects the MIB of the module identified by the identifier IOR that the identifier indirect obtaining unit 257 has output from the DII that the data separation unit 154 has output, and output the identifier IOR and the selected MIB to the direct directory message body restoration unit 262.

The direct directory message body restoration unit 262 extracts the "directDictionaryInfo" from the MIB that the direct directory message block selection unit 261 has output, and restores a direct directory message body according to the extracted "directDictionaryInfo".

The direct directory message body storage unit 263 holds the restored direct directory message body. When one direct directory message body is held and another direct directory message body is restored, the newly restored direct directory message body should be given priority, i.e., the previously restored one is deleted and the newly restored one is held.

The identifier directly obtaining unit 264 retrieves the reference name that a key list buffer 259 stores from the direct directory message body that the direct directory message body storage unit 263 stores. When retrieving the reference name, the identifier directly obtaining unit 264 creates an identifier IOR from the ModuleId and the object key corresponding to the reference name, and outputs the created identifier IOR to the data block selection unit 253. When failing to retrieve the reference name, the identifier directly obtaining unit 264 informs the identifier indirect obtaining unit 257 of the failure, and instructs the identifier indirect obtaining unit 257 to perform the conventional processing.

The data block selection unit 253 selects the file object corresponding to the identifier IOR that the identifier directly obtaining unit 264 has output from the data block that the data separation unit 254 has output, and outputs the selected file object from a terminal B.

[Operations of Reception Apparatus]

Here, the operations by the reception apparatus 250 is explained as an example, where the reception apparatus 250 receives and executes the MHEG(ISO/IEC13522-5) program shown in FIG. 2.

Figure 16:
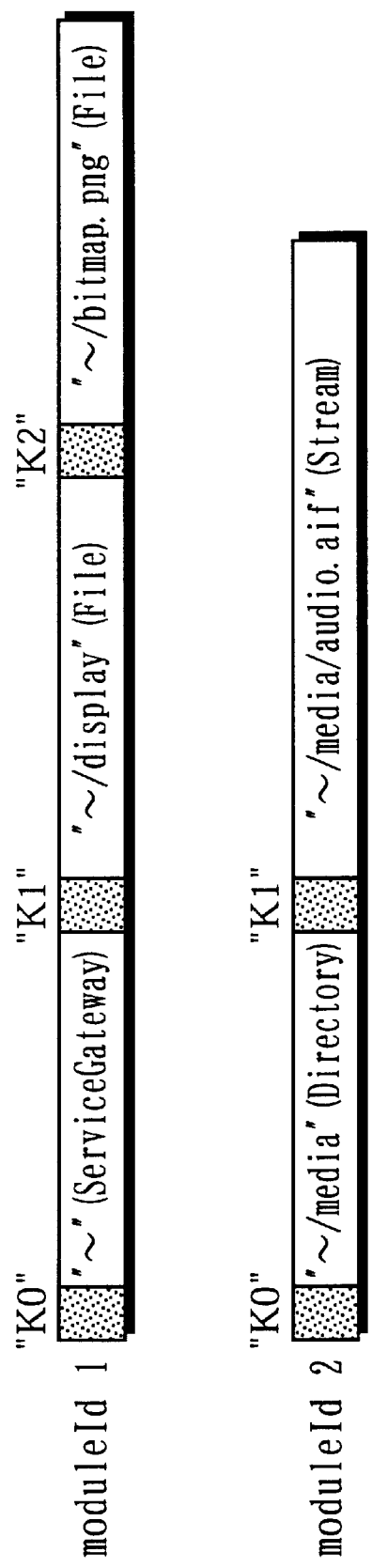
FIG. 16 is an internal view of the ModuleId1 and ModuleId2, which are to be transmitted by the transmission apparatus 200.

FIG. 16 is an internal view of the ModuleId1 and ModuleId2, which are to be transmitted by the transmission apparatus 200.

The reception apparatus 250 reads a file object "~/display" to execute the MHEG program shown in FIG. 2.

Figure 17:
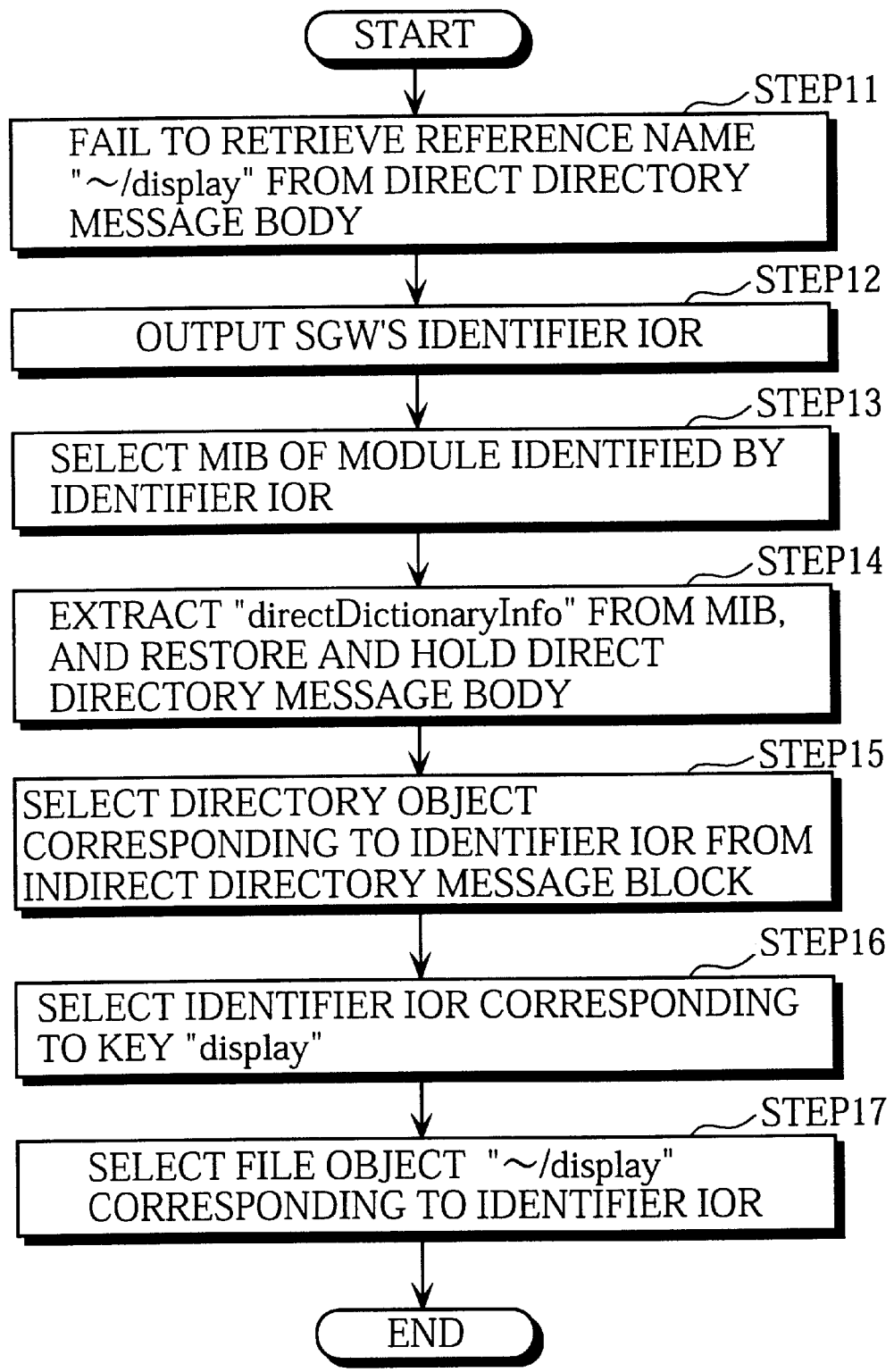
FIG. 17 is a flowchart showing the processing of the reception of the file object "~/display" by the reception apparatus 250 according to the first embodiment.

FIG. 17 is a flowchart showing the processing of the reception of the file object "~/display" by the reception apparatus 250 according to the first embodiment.

The explanation of the processing will be given below.

(1) The identifier directly obtaining unit 264 tries to retrieve the reference name "~/display" that the key list buffer 259 stores from the direct directory message body that the direct directory message body storage unit 263 stores. At this point in time, however, no direct directory message body is stored in the direct directory message body storage unit 263, so that the reference name is not retrieved. The identifier indirect obtaining unit 257 is informed of the failure of retrieval, and is instructed to perform the conventional processing (Step S11).

(2) The identifier indirect obtaining unit 257 outputs the identifier IOR of the SGW to the direct directory message block selection unit 261, the indirect directory message block selection unit 155, and the data block selection unit 253 according to the key "~" that the key information selection unit 158 has output (Step S12).

(3) The direct directory message block selection unit 261 that has received the IOR of the SGW selects the MIB of the module identified by the identifier IOR that the identifier indirect obtaining unit 257 has output in the DII that the data separation unit 254 has output, and outputs the identifier IOR and the MIB to the direct directory message body restoration unit 262 (Step S13).

(4) The ModuleId1 that is transmitted from the transmission apparatus 200 includes the "SGW", the "~/display", and the "~/bitmap.png" as shown in FIG. 16. In addition, the direct directory message blocks regarding the "~/display" and the "~/bitmap.png" are included in the "directDictionaryInfo" in the MIB in the corresponding DII as shown in FIG. 11. As a result, the direct directory message body restoration unit 262 extracts the "directDictionaryInfo" from the MIB that the direct directory message block selection unit 261 has output, and restores a direct directory message body according to the extracted "directDictionaryInfo". The direct directory message body storage unit 263 holds the restored direct directory message body (Step S14).

(5) The indirect directory message block 155 that has received the identifier IOR of the SGW selects the directory object corresponding to the identifier IOR that the identifier indirect obtaining unit 257 has output from the indirect directory message block that the data separation unit 254 has output, and outputs the selected directory object to the directory message body obtaining unit 156 (Step S15).

(6) The identifier indirect obtaining unit 257 selects the identifier IOR corresponding to the key "display" that the key information selection unit 258 has output from the indirect directory message body that the directory message body obtaining unit 156 has output, and outputs the selected identifier IOR to the direct directory message block selection unit 261, the indirect directory message block selection unit 155, and the data block selection unit 253 (Step S16).

(7) The data block selection unit 253 selects the file object "~/display" corresponding to the identifier IOR that the identifier indirect obtaining unit 257 has output from the data block that the data separation unit 254 has output, and outputs the selected file object from the terminal "B" (Step S17).

After Step S17, the execution of the MHEG program shown in FIG. 2 proceeds, and the bitmap data file object "~/bitmap/png" for drawing is read.

Figure 18:
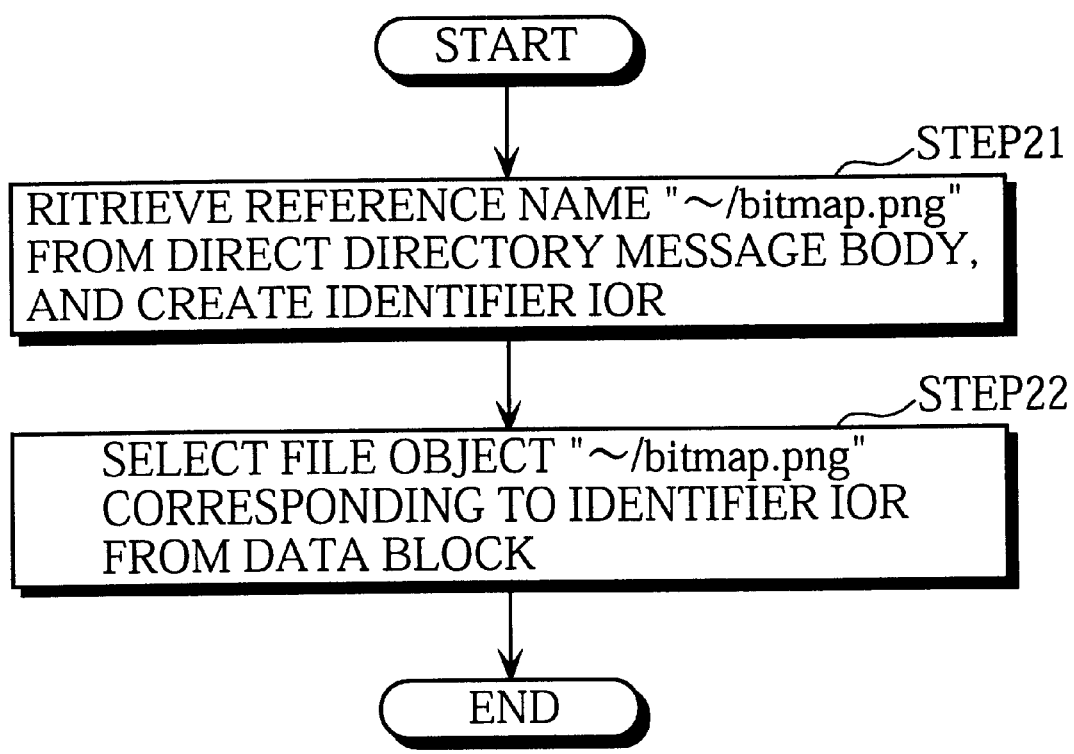
FIG. 18 is a flowchart showing the processing of the reception of the bitmap data file object "~/bitmap.png" by the reception apparatus 250 according to the first embodiment after the reception of the file data file object "~/display"

FIG. 18 is a flowchart showing the processing in receiving the bitmap data file object "~/bitmap.png" by the reception apparatus 250 according to the first embodiment after the reception of the file data file object "~/display".

The explanation of the operations in the processing will be given below.

(1) The identifier directly obtaining unit 264 tries to retrieve the reference name "~/bitmap.png" that the key list buffer 259 stores from the direct directory message body that the direct directory message body storage unit 263 stores. At this point in time, the direct directory message body storage unit 263 stores the direct directory message body, so that the identifier directly obtaining unit 264 retrieves the reference name, creates an identifier IOR from the ModuleId and the object key corresponding to the reference name "~/bitmap.png", and outputs the created identifier IOR to the data block selection unit 253 (Step S21).

(2) The data block selection unit 253 selects the file object "~/bitmap.png" corresponding to the identifier IOR that the identifier directly obtaining unit 264 has output from the data block that the data separation unit 254 has output, and outputs the selected file object from the terminal B (Step S22).

After Step S22, the execution of the MHEG program shown in FIG. 2 proceeds, and the directory object "~/media" is received as in the case of the processing in FIG. 17. At the time of the reception, the direct directory message body on the audio stream object "~/media/audio.aif" is restored and held. As in the case of the processing shown in FIG. 18, the audio stream object "~/media/audio.aif" is received.

As has been described, according to the first embodiment, when a data file is received, a direct directory message body on the corresponding simultaneously-used-files is received, and when one of the simultaneously-used-files is received following the received data file, the simultaneously-used-file is received by referring to the direct directory message body without tracing directories. As a result, the period of time required to receive the files is shortened as a hole.

The Second Embodiment

[Outline]

The second embodiment of the present invention is the same as the first embodiment in shortening the time in reception as a whole by inserting a direct directory message body on the transmission side and referring to the direct directory message body on the reception side.

The second embodiment differs from the first embodiment in storing the data of a direct directory message body in the "objectInfo" in the BIOP::Binding structure in a indirect directory message block. On the other hand, the direct directory message body data is stored in the MIB, i.e., part of the DII in the DSM-CC-UN in the first embodiment.

[Structure of Transmission Apparatus]

Figure 19:
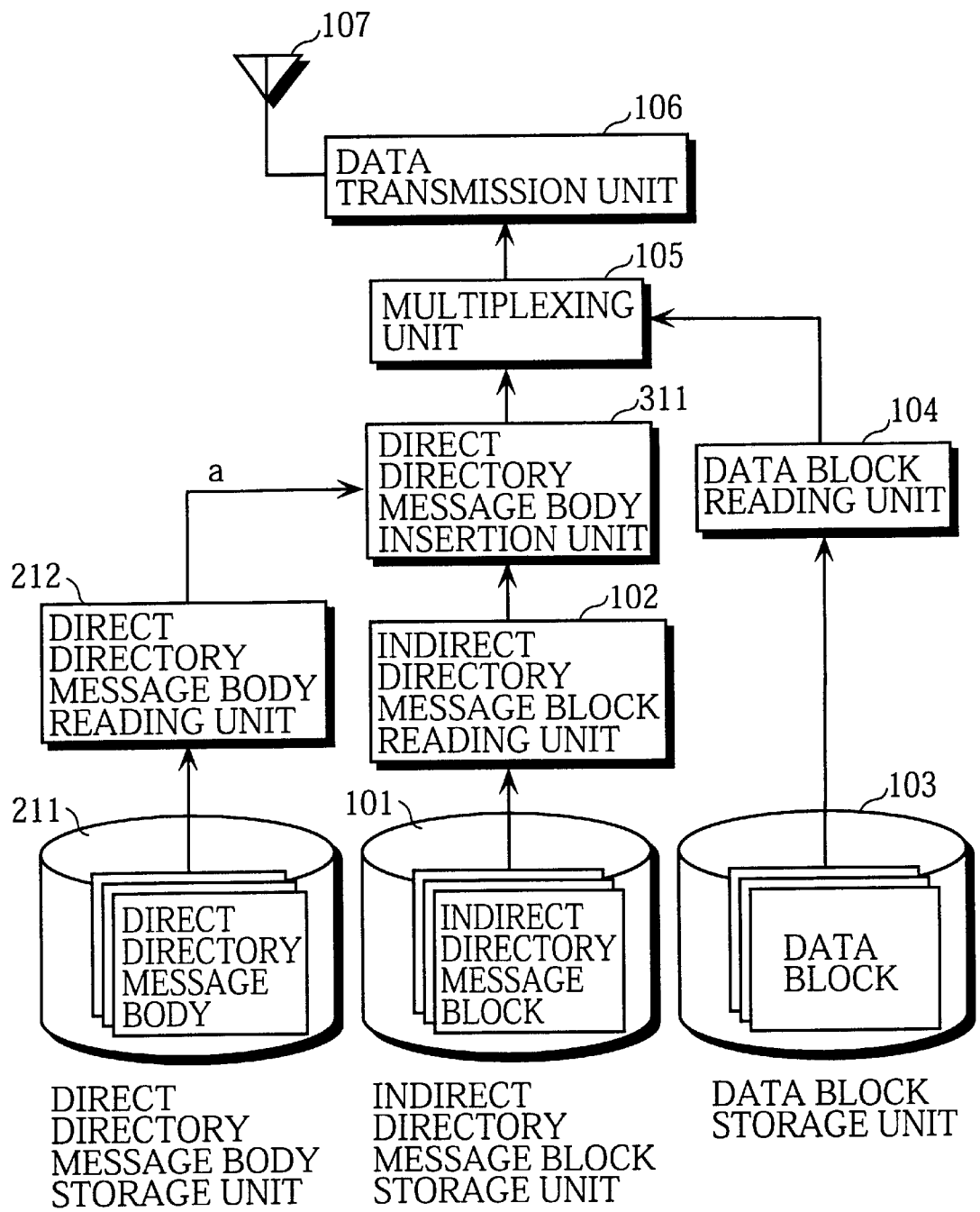
FIG. 19 shows the structure of a transmission apparatus according to the second embodiment.

FIG. 19 shows the structure of a transmission apparatus according to the second embodiment.

A transmission apparatus 300 shown in FIG. 19 includes an indirect directory message block storage unit 101, an indirect directory message block reading unit 102, a data block storage unit 103, a data block reading unit 104, a multiplexing unit 105, a data transmission unit 106, an antenna 107, a direct directory message body storage unit 211, a direct directory message body reading unit 212, and a direct directory message body insertion unit 311.

Here, the elements having the same functions as in the conventional transmission apparatus 100 and the transmission apparatus 200 in the first embodiment are given the same reference numbers and the explanation of these elements will not be given below.

As shown in FIG. 28, the "objectInfo", which may store the auxiliary information on a directory object, is defined in the BIOP::Binding structure of the directory message in the DSM-CC. The data of a direct directory message body is stored in the "objectInfo" and transmitted in the second embodiment.

FIG. 20 shows the definition of the BIOP::directDictionary, which is used in storing direct directory message body data in the "objectInfo".

The direct directory message body data shown in FIG. 20 is substantially the same as shown in FIG. 9 referred to in the first embodiment.

The direct directory message body insertion unit 311 inserts direct directory message body data into the "objectInfo" in the BIOP::Binding structure in an indirect directory message block. For instance, the direct directory message body insertion unit 311 inserts the direct directory message body data shown in FIG. 6 into objects in FIGS. 4 and 5, and creates the directory objects shown in FIGS. 21 and 22.

[Operations of Transmission Apparatus]

Figure 23:
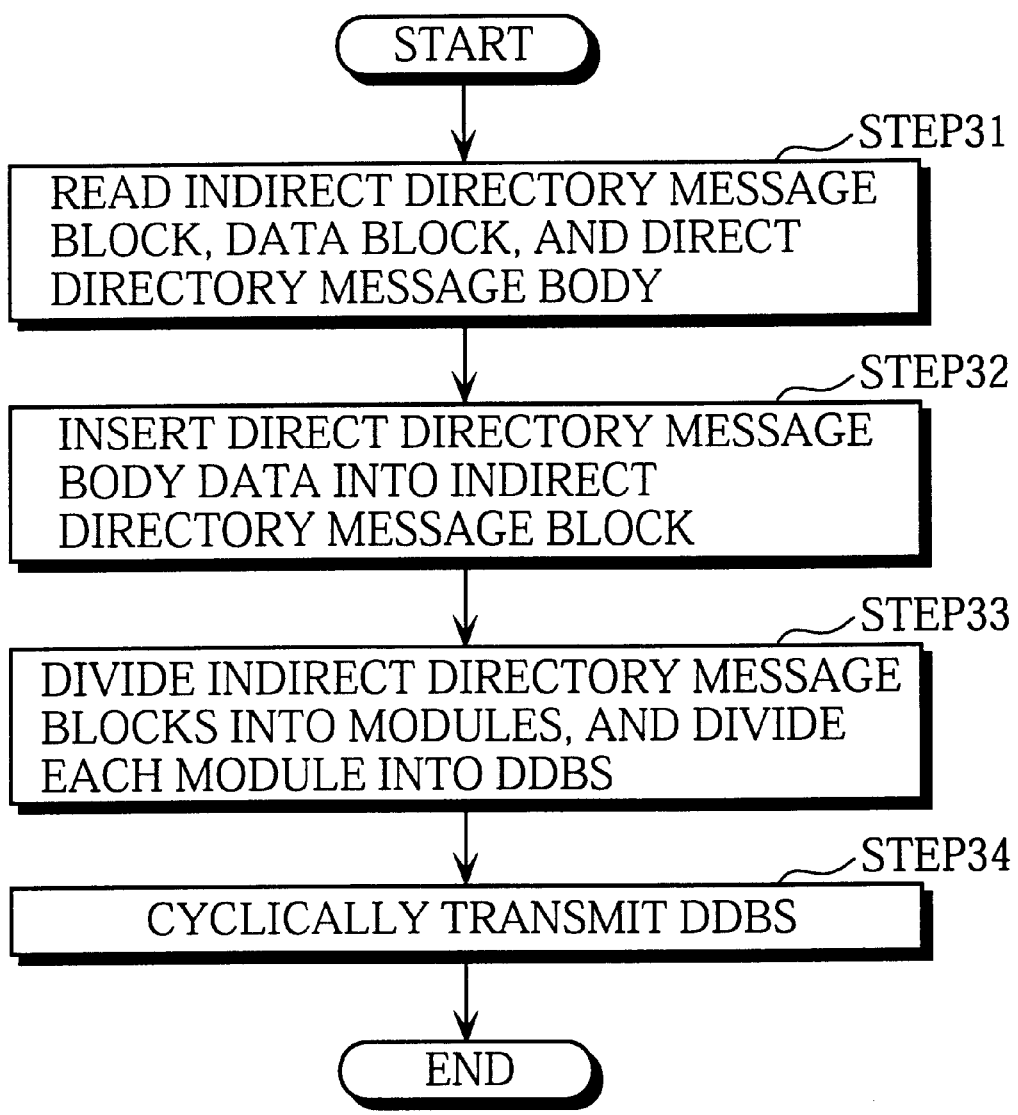
FIG. 23 is a flowchart showing the processing of the digital data transmission by the transmission apparatus 300 according to the second embodiment.

FIG. 23 is a flowchart showing the processing of the digital data transmission by the transmission apparatus 300 according to the second embodiment.

The operations by the transmission apparatus 300 will be described with reference to FIG. 23.

(1) The indirect directory message block reading unit 102 reads an indirect directory message block from the indirect directory message block storage unit 101, the data block reading unit 104 reads a data block from the data block storage unit 103, and the direct directory message body reading unit 212 reads a direct directory message body from the direct directory message body storage unit 211 (Step S31).

(2) The direct directory message body insertion unit 311 inserts the data of the direct directory message body into the "objectInfo" in the BIOP::Binding structure in the indirect directory message block (Step S32).

(3) The multiplexing unit 105 divides indirect directory message blocks into which direct directory message bodies have been inserted and read data blocks into a plurality of modules. Each of the modules is given a different identification number. In one module, each of the BIOPs are given a different object key, and each of the modules is divided into DDBs, i.e., transmission units (Step S33).

(4) The data transmission unit 106 cyclically transmits the DDBs (Step S34).

When receiving a data file, the transmission apparatus 300 does not need to trace directories. The transmission apparatus 300 only needs to refer to the direct directory message body corresponding to the data file.

[Structure of Reception Apparatus]

Figure 24:
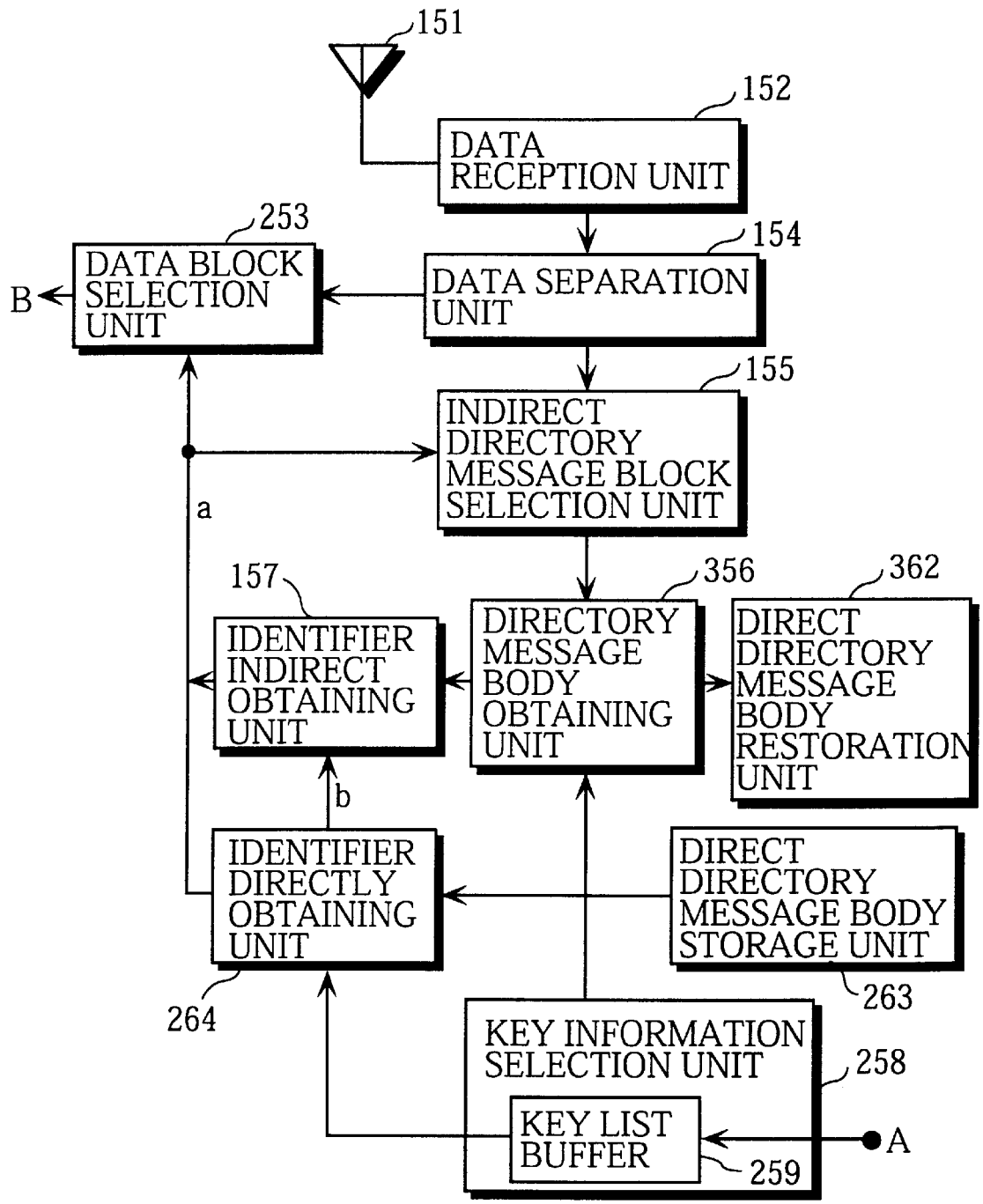
FIG. 24 shows the structure of a reception apparatus according to the second embodiment of the present invention.

FIG. 24 shows the structure of a reception apparatus according to the second embodiment of the present invention.

A reception apparatus 350 in FIG. 24 includes a reception antenna 151, a data reception unit 152, a data block selection unit 253, a data separation unit 154, an indirect directory message block selection unit 155, a directory message body obtaining unit 356, an identifier indirect obtaining unit 157, a key information selection unit 258, a direct directory message body restoration unit 362, a direct directory message body storage unit 263, and an identifier directly obtaining unit 264.

Here, the elements having the same functions as in the conventional reception apparatus 150 and the reception apparatus 250 in the first embodiment are given the same reference numbers and the explanation of these elements will not be given below.

Note that the reception apparatus 350 receives digital stream data transmitted from the transmission apparatus 300 that has been created by multiplexing at least one indirect directory message blocks into which direct directory message body data has been inserted and data blocks.

The direct directory message body restoration unit 356 obtains an indirect directory message body into which direct directory message body data has been inserted from a directory object, outputs the indirect directory message body from which the direct directory message body data has been removed to the identifier indirect obtaining unit 157, and outputs the direct directory message body data to the direct directory message body restoration unit 362.

The direct directory message body restoration unit 362 obtains the direct directory message body data that has been inserted into the "ObjectInfo" in the BIOP::Binding structure in the indirect directory message block, and restores the direct directory message body.

[Operations of Reception Apparatus]

Here, the operations by the reception apparatus 350 is explained as an example, where the reception apparatus 350 receives and executes the MHEG(ISO/IEC13522-5) program shown in FIG. 2.

The reception apparatus 350 reads the file data file object "~/display" to execute the MHEG program shown in FIG. 2.

Figure 25:
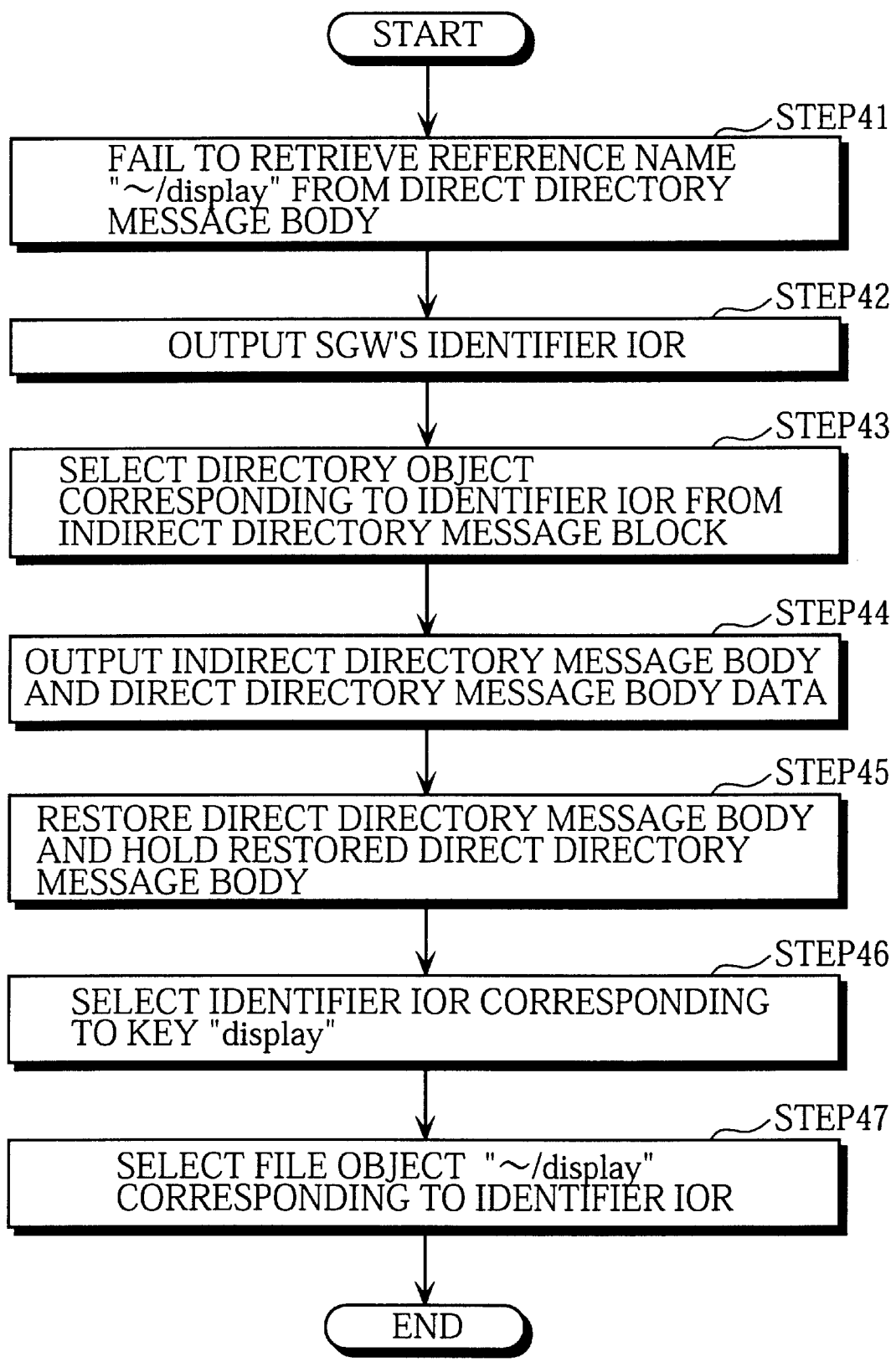
FIG. 25 is a flowchart showing the processing of the reception of the file data file object "~/display" by the reception apparatus 350 according to the second embodiment.
Figure 26:
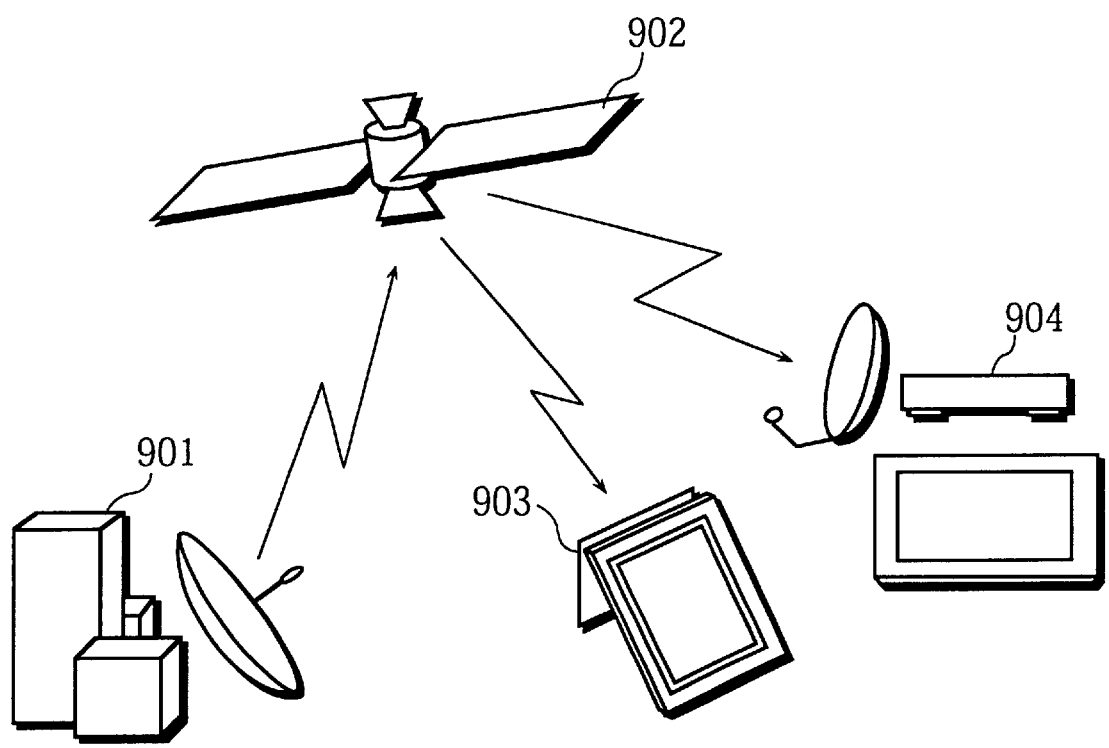
FIG. 26 is a schematic diagram of a data transmission/reception system.
Figure 27:
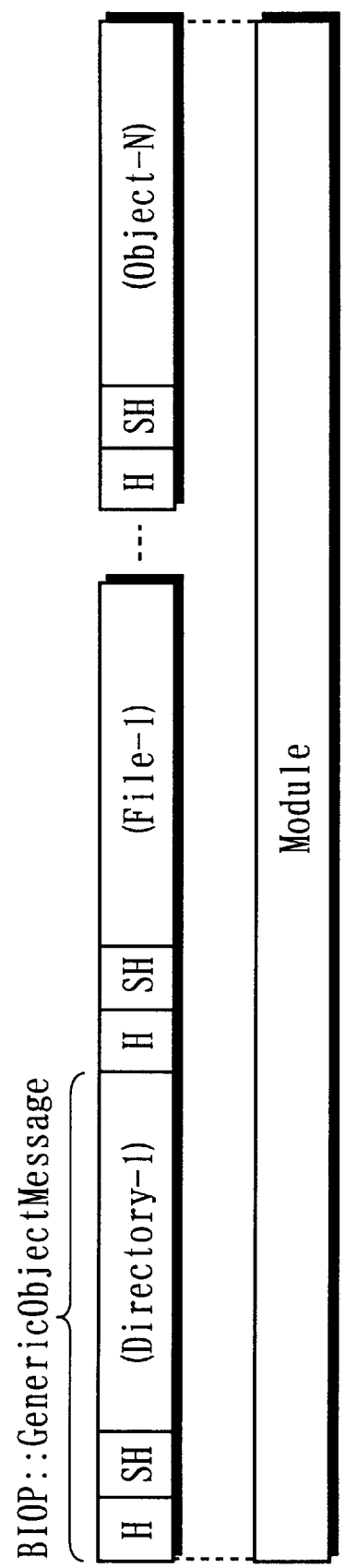
FIG. 27 shows a module composed of a plurality of BIOP messages.
Figure 32:
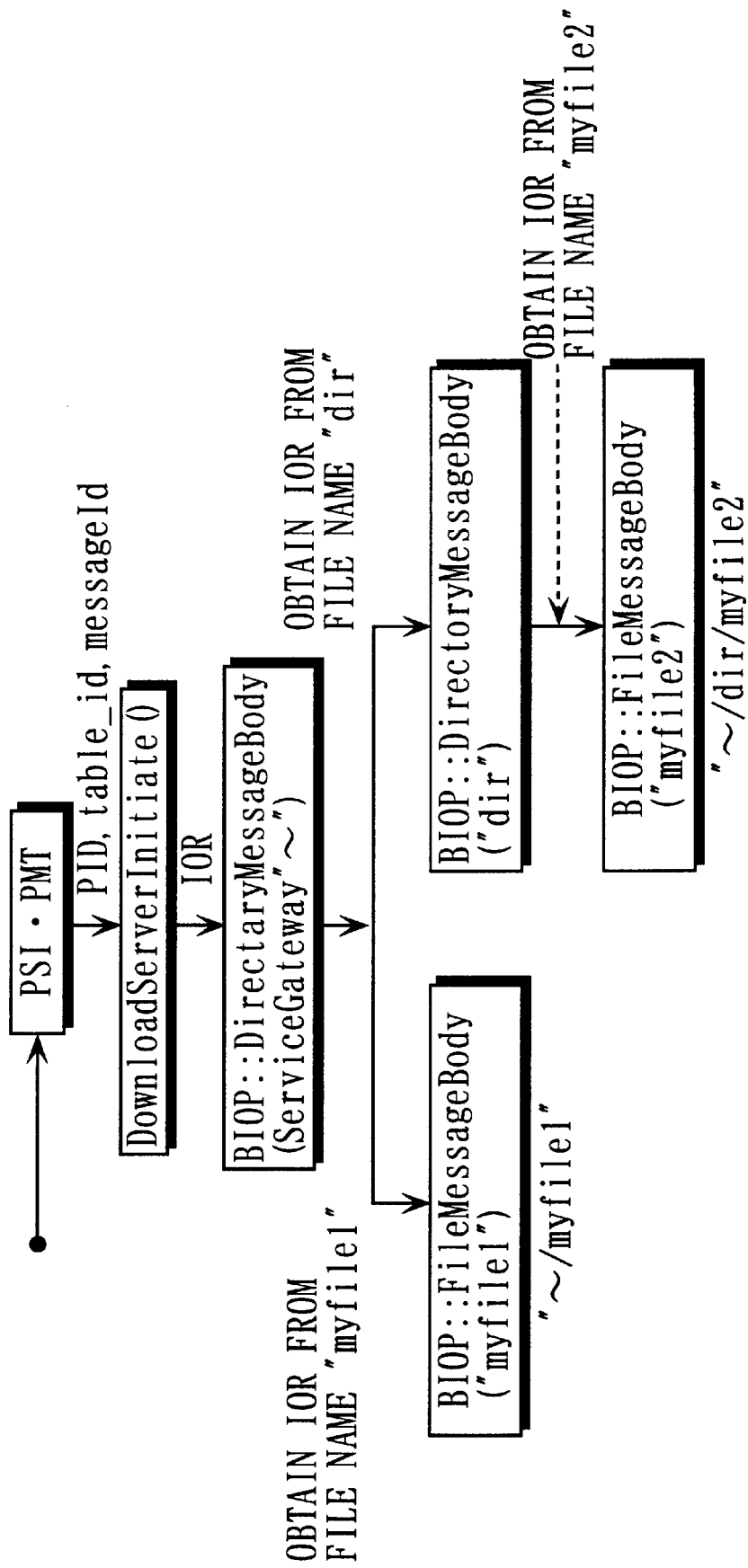
FIG. 32 is a schematic diagram of a conventional method for referring to a file message according to a file name (a key list) in the object carousel transmission method.
Figure 33:
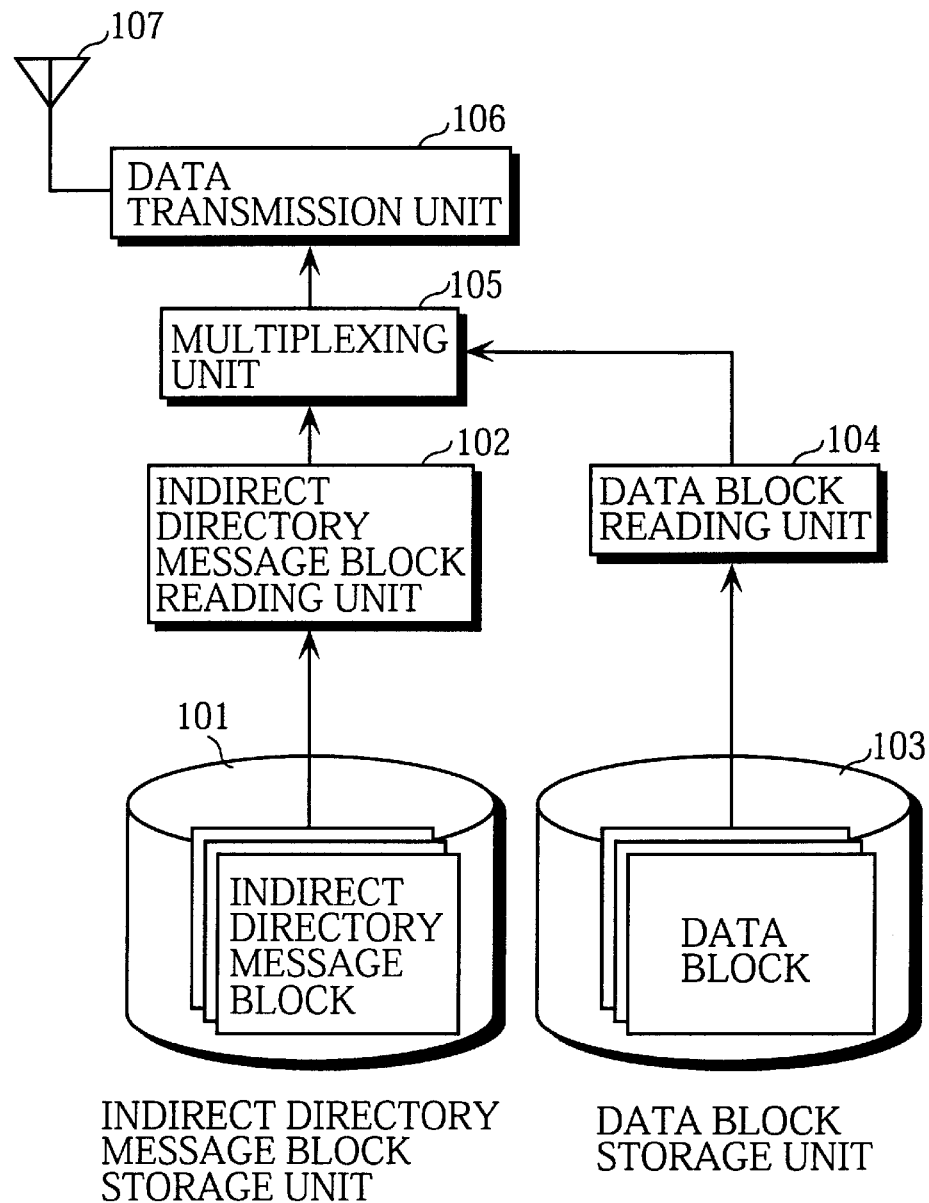
FIG. 33 shows the structure of a conventional transmission apparatus for transmitting files having directory structures according to the object carousel transmission method.
Figure 34:
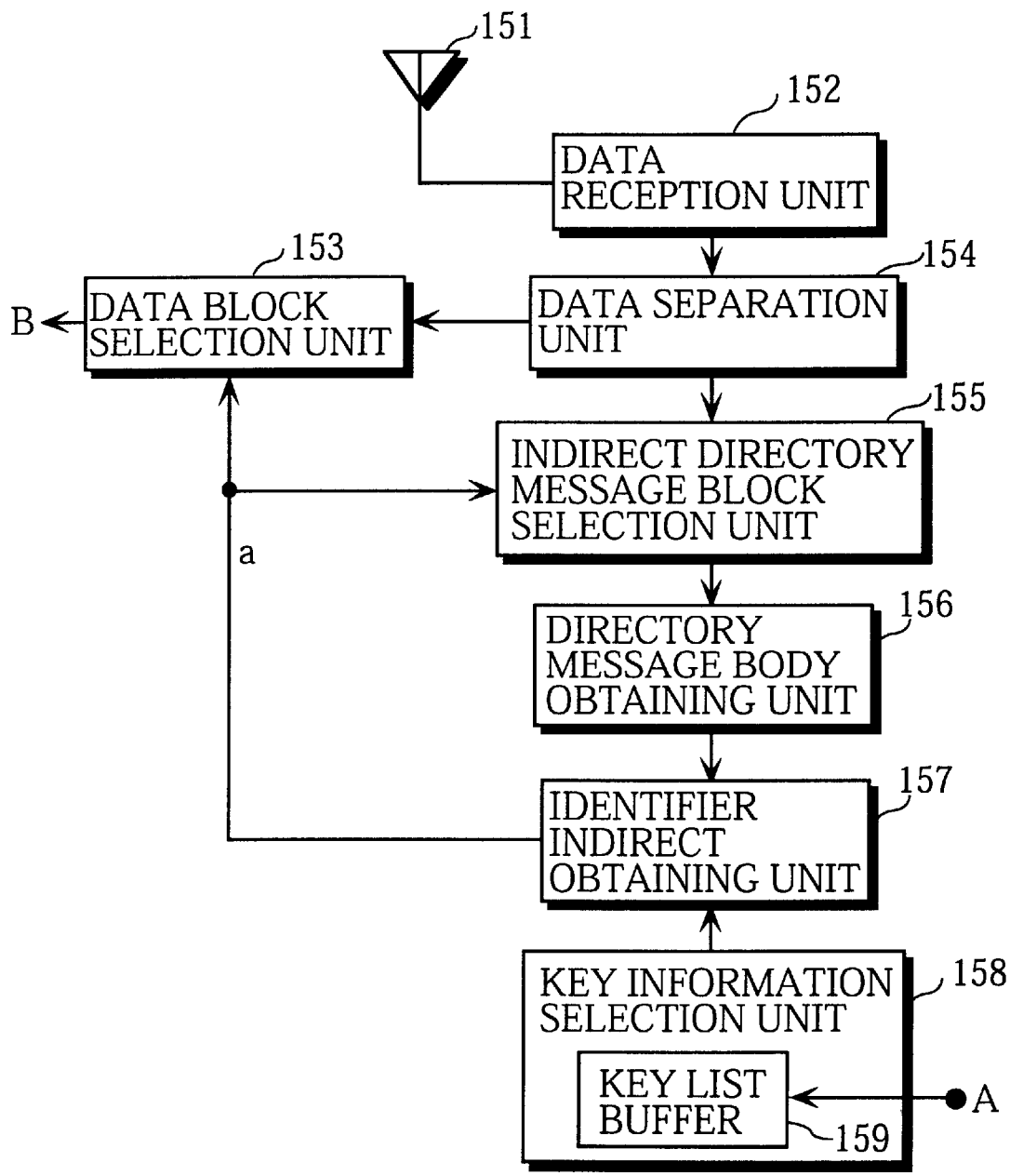
FIG. 34 shows the structure of a conventional reception apparatus that receives files having directory structures according to the object carousel method.
Figure 35:
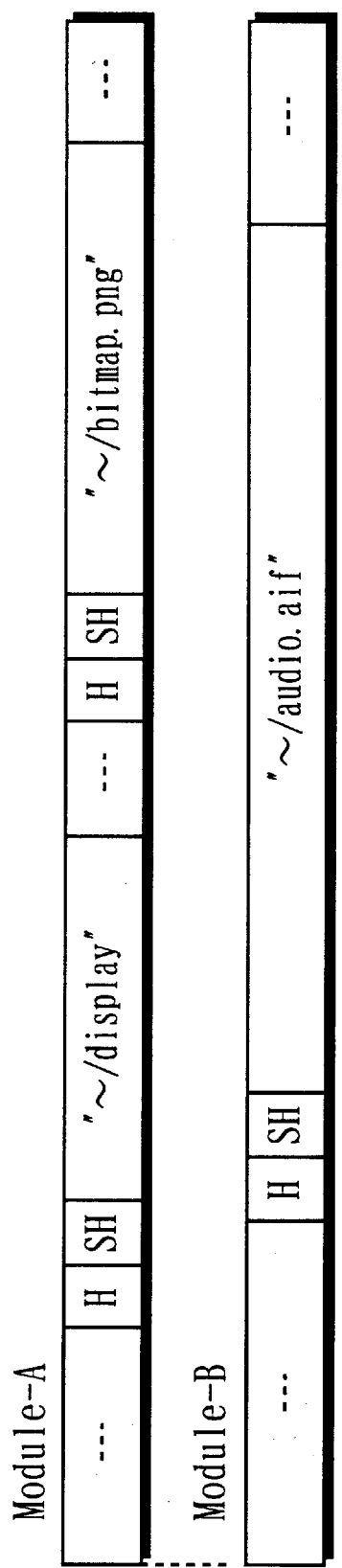
FIG. 35 shows examples of simultaneously-used-files transmitted in one module.

FIG. 25 is a flowchart showing the processing of the reception of the file data file object "~/display" by the reception apparatus 350 according to the second embodiment.

The explanation of the processing will be given below.

(1) The identifier directly obtaining unit 264 tries to retrieve the reference name "~/display" that the key list buffer 259 stores from the direct directory message body that the direct directory message body storage unit 263 stores. At this point in time, however, no direct directory message body is stored in the direct directory message body storage unit 263, so that the reference name is not retrieved. The identifier indirect obtaining unit 257 is informed of the failure of retrieval, and is instructed to perform the conventional processing (Step S41).

(2) The identifier indirect obtaining unit 157 outputs the identifier IOR of the SGW to the indirect directory message block selection unit 155 and the data block selection unit 253 according to the key "~" that the key information selection unit 258 has output (Step S42).

(3) The indirect directory message block 155 that has received the identifier IOR of the SGW selects the directory object corresponding to the identifier IOR that the identifier indirect obtaining unit 157 has output from the indirect directory message block that the data separation unit 154 has output, and outputs the selected directory object to the directory message body obtaining unit 356 (Step S43).

(4) The directory message body obtaining unit 356 obtains the indirect directory message body into which direct directory message body has been inserted, outputs the indirect directory message body from which the direct directory message body has been removed to the identifier indirect obtaining unit 157, and outputs the direct directory message body to the direct directory message body restoration unit 362 (Step S44).

(5) As in the case of the first embodiment, the ModuleId1 that is transmitted from the transmission apparatus 300 includes the "SGW", the "~/display", and the "~/bitmap.png" as shown in FIG. 16. In addition, the direct directory message body data regarding the "~/display" and the "~/bitmap.png" are included in the corresponding "directInfo"s in the BIOP::Binding structure as shown in FIGS. 21 and 22. As a result, the direct directory message body restoration unit 362 restores the direct directory message body according to the direct directory message body data that the directory message body obtaining unit 356 has output. The direct directory message body storage unit 263 holds the restored direct directory message body (Step S45).

(6) The identifier indirect obtaining unit 157 selects the identifier IOR corresponding to the key "display" that the key information selection unit 258 has output from the indirect directory message body that the directory message body obtaining unit 356 has output, and outputs the selected identifier IOR to the indirect directory message block selection unit 155 and the data block selection unit 253 (Step S46).

(7) The data block selection unit 253 selects the file object "~/display" corresponding to the identifier IOR that the identifier indirect obtaining unit 157 has output from the data block that the data separation unit 154 has output, and outputs the selected file object from the terminal "B". (Step S47).

After Step S47, the execution of the MHEG program shown in FIG. 2 proceeds, and the bitmap data file object "~/bitmap/png" for drawing is read.

The explanation of the operations when the reception apparatus 350 receives the bitmap data file object "~/bitmap/png" after the reception of the file data file object "~/display" will not given since the operations are the same as explained with reference to FIG. 18 in the first embodiment.

After the reception of the bitmap data "~/bitmap/png", the execution of the MHEG program shown in FIG. 2 proceeds, and the directory object "~/media" is received as in the case of the processing in FIG. 25. At the time of the reception, the direct directory message body on the audio stream object "~/media/audio.aif" is restored and held. As in the case of the processing shown in FIG. 18, the audio stream object "~/media/audio.aif" is received.

As has been described, according to the second embodiment, when a data file is received, a direct directory message body on the corresponding simultaneously-used-files is received, and when one of the simultaneously-used-files is received following the received data file, the simultaneously-used-file is received by referring to the direct directory message body without tracing directories. As a result, the period of time required to receive the files is shortened as a whole.

While the direct directory message body has a list structure in the first and second embodiments, the direct directory message body may have another structure such as a table structure.

While the key used for the retrieval from a directory message body and the object key in the identifier IOR are character strings in the first and second embodiments, the key and the object key may be, for instance, numerical values.

While the direct directory message body data is inserted into the "directDictionaryInfo" in the MIB in the DII and is transmitted in the first embodiment, the direct directory message body data may be inserted into, for instance, an independent private section, and be transmitted.

While the direct directory message body data is inserted into the "objectInfo" in the BIOP::Binding structure and is transmitted in the second embodiment, the direct directory message body data may be inserted into, for instance, the "objectInfo" in the "Message SubHeade" in the BIOP::Generic Object Message.

While each of the first and second embodiments has been explained as hardware such as a Logic IC, the first and second embodiments may be realized by software. The software is the object of production, use, assignment, import, and the proposal of assignment or lease as in the case of an apparatus even when stored in a computer-readable recording medium such as a CD-ROM.

Although the present invention has been fully described by way of examples with reference to the accompanying drawings, it is to be noted that various changes and modifications will be apparent to those skilled in the art. Therefore, unless such changes and modifications depart from the scope of the present invention, they should by construed as being included therein.

INDUSTRIAL USE POSSIBILITY

The present invention may be applied to a transmission apparatus with which a variety of data such as movie data is transmitted from broadcasting stations and a reception apparatus with which the user receives the transmitted data. By doing so, data may be received in a shorter period of time than ever.

The present invention may be applied to other transmission and reception of such as a ground wave aside from digital satellite broadcasting.

What is claimed is:

1. A data reception apparatus that receives a file system having a directory structure and obtains a data file corresponding to a reference name starting from a predetermined directory name, wherein a data block includes a data file and an identifier of the data block, the data reception apparatus, comprising:

storage means for storing a direct directory message body that is used for directly specifying an identifier of a data block corresponding to a reference name according to the reference name;

reference name obtaining means for obtaining a reference name of a data file to be obtained;

reception means for receiving multiplexed data into which a plurality of indirect directory message blocks, a plurality of data blocks, and data of at least one direct directory message body have been multiplexed, each of the indirect directory message blocks including an identifier of the indirect directory message block and an indirect directory message body that is used for specifying an identifier of a data block corresponding to a data file belonging to a first directory according to a name of the data file and is used for specifying an identifier of an indirect directory message block corresponding to a second directory belonging to the first directory according to a name of the second directory for each directory;

separation means for extracting indirect directory message blocks, data blocks, and data of direct directory message body from the received multiplexed data and outputting the extracted indirect directory message blocks, data blocks, and direct directory message body data;

direct reference means for outputting, when the direct directory message body stored by the storage means includes the reference name that the reference name obtaining means has obtained, a data block identifier that is directly specified according to the reference name according to the direct directory message body;

key information creation means for separating, when the direct directory message body stored by the storage means does not include the reference name that the reference name obtaining means has obtained, a directory name and a file name in the reference name to create key information, and outputting the created key information;

indirect reference means for outputting, when key information output by the key information creation means is a predetermined directory name, an identifier of an indirect directory message block of the predetermined directory name;

indirect directory message block selection means for selecting an indirect directory message block corresponding to the key information from the indirect directory message blocks that the separation means has output according to the indirect directory message block identifier that the indirect reference means has output;

indirect directory message body extraction means for extracting an indirect directory message body from the selected indirect directory message block, wherein when the key information that has been output by the key information creation means is not a predetermined directory name, the indirect reference means repeatedly retrieves an identifier corresponding to the key information from the indirect directory message body that the indirect directory message body extraction means has extracted and outputs the retrieved identifier until a data block identifier is retrieved;

data block selection means for selecting a data block corresponding to the key information from the data blocks that the separation means has output according to an identifier that one of the direct reference means and the indirect reference means has output and extracting a data file from the selected data block;

direct directory message body selection means for selecting data of a direct directory message body corresponding to the data block from the data of direct directory message body that the separation means has output; and updating means for storing the selected direct directory message body data in the storage means.

2. The data reception apparatus according to claim 1, wherein the reception means receives multiplexed data into which information in a process before selection of the data block, and direct directory message body data corresponding to the data block have been multiplexed, and the direct directory message body selection means selects the direct directory message body data corresponding to the data block in the process before selection of the data block.

3. The data reception apparatus according to claim 2, wherein direct directory message body data corresponding to a first data block is information that has been multiplexed into information in a process of selecting the first data block and directly specifies an identifier of a second data block according to a reference name of the second data block that is expected to be successively selected after a selection of the first data block.

4. The data reception apparatus according to claim 3, wherein the direct directory message body data corresponding to the first data block for a module is multiplexed into a stream that transmits the reproduction information for the module including the first data block, and when receiving the stream that transmits the reproduction information, the direct directory message body selection means selects direct directory message body data corresponding to the module from the stream.

5. The data reception apparatus according to claim 3, wherein the direct directory message body data corresponding to the first data block is multiplexed into the indirect directory message block that has been selected by the indirect directory message block selection means when the first data block is selected, and the direct directory message body selection means selects direct directory message body data from the indirect directory message block that the indirect directory message block selection means has selected.

6. A data transmission apparatus that transmits a file system having a directory structure, comprising:

obtaining means for obtaining a plurality of indirect directory message blocks, a plurality of data blocks, and at least one direct directory message body, each of the indirect directory message blocks including an identifier of the indirect directory message block and an indirect directory message body that is used for specifying an identifier of a data block corresponding to a data file belonging to a first directory according to a name of the data file and is used for specifying an identifier of an indirect directory message block corresponding to a second directory belonging to the first directory according to a name of the second directory for each directory, a data block includes an identifier of the data block and a data file, a direct directory message body is used to directly specify an identifier of a data block corresponding to a reference name starting from a predetermined directory name;

multiplexing means for multiplexing the obtained indirect directory message blocks, the obtained data blocks, and data of the obtained direct directory message body, and creating multiplexed data; and transmission means for transmitting the created multiplexed data.

7. The data transmission apparatus according to claim 6, wherein a direct directory message body is information that is used to directly specify an identifier of a data block corresponding to a reference name of a data file according to the reference name for each of a plurality of data files that are expected to be simultaneously or successively obtained.

8. The data transmission apparatus according to claim 7, wherein the multiplexing means multiplexes direct directory message body data into information used for specifying a data block represented by a reference name in the direct directory message body for each reference name in the direct directory message body.

9. The data transmission apparatus according to claim 8, wherein the multiplexing means multiplexes direct directory message body data into a stream used for specifying a module represented by an identifier in the direct directory message body.

10. The data transmission apparatus according to claim 8, wherein the multiplexing means multiplexes direct directory message body data into indirect directory message blocks used for specifying a data block represented by a reference name in the direct directory message body for each reference name in the direct directory message body.

11. A data reception method for receiving a file system having a directory structure and obtaining a data file corresponding to a reference name starting from a predetermined directory name in a data reception apparatus that includes storage means for storing a direct directory message body used for directly specifying an identifier of a data block corresponding to the reference name according to the reference name, a data block includes a data file and an identifier of the data block, the data reception method comprising:

a reference name obtaining step for obtaining a reference name of a data file to be obtained;

a reception step for receiving multiplexed data into which a plurality of indirect directory message blocks, a plurality of data blocks, and data of at least one direct directory message body have been multiplexed, each of the indirect directory message blocks including an identifier of the indirect directory message block and an indirect directory message body that is used for specifying an identifier of a data block corresponding to a data file belonging to a first directory according to a name of the data file and is used for specifying an identifier of an indirect directory message block corresponding to a second directory belonging to the first directory according to a name of the second directory for each directory;

a separation step for extracting indirect directory message blocks, data blocks, and data of direct directory message body from the received multiplexed data and outputting the extracted indirect directory message blocks, data blocks, and direct directory message body data;

a direct reference step for outputting, when the direct directory message body stored in the storage means includes the reference name that has been obtained at the reference name obtaining step, a data block identifier that is directly specified according to the reference name according to the direct directory message body;

a key information creation step for separating, when the direct directory message body stored in the storage means does not include the reference name that has been obtained at the reference name obtaining step, a directory name and a file name in the reference name to create key information, and outputting the created key information;

an indirect reference step for outputting, when key information output at the key information creation step is a predetermined directory name, an identifier of an indirect directory message block of the predetermined directory name;

an indirect directory message block selection step for selecting an indirect directory message block corresponding to the key information from the indirect directory message blocks that has been output at the separation step according to the indirect directory message block identifier that has been output at the indirect reference step;

an indirect directory message body extraction step for extracting an indirect directory message body from the selected indirect directory message block, wherein when the key information that has been output at the key information creation step is not a predetermined directory name, an identifier corresponding to the key information is repeatedly retrieved from the indirect directory message body that has been extracted at the indirect directory message body extraction step and the retrieved identifier is output until a data block identifier is retrieved at the indirect reference step;

a data block selection step for selecting a data block corresponding to the key information from the data blocks that has been output at the separation step according to an identifier that has been output at one of the direct reference step and the indirect reference step and extracting a data file from the selected data block;

a direct directory message body selection step for selecting data of a direct directory message body corresponding to the data block from the data of direct directory message body that has been output at the separation step; and an updating step for storing the selected direct directory message body data at the storage step.

12. A data transmission method for transmitting a file system having a directory structure, comprising:

an obtaining step for obtaining a plurality of indirect directory message blocks, a plurality of data blocks, and at least one direct directory message body, each of the indirect directory message blocks including an identifier of the indirect directory message block and an indirect directory message body that is used for specifying an identifier of a data block corresponding to a data file belonging to a first directory according to a name of the data file and is used for specifying an identifier of an indirect directory message block corresponding to a second directory belonging to the first directory according to a name of the second directory for each directory, a data block includes an identifier of the data block and a data file, a direct directory message body is used to directly specify an identifier of a data block corresponding to a reference name starting from a predetermined directory name;

a multiplexing step for multiplexing the obtained indirect directory message blocks, the obtained data blocks, and data of the obtained direct directory message body, and creating multiplexed data; and a transmission step for transmitting the created multiplexed data.

13. A computer-readable recording medium that records a data reception program for receiving a file system having a directory structure and for obtaining a data file corresponding to a reference name starting from a predetermined directory name in a data reception apparatus that includes storage means for storing a direct directory message body directly specifying an identifier of a data block corresponding to the reference name according to the reference name, a data block includes a data file and an identifier of the data block, the data reception program has a computer execute steps, comprising:

a reference name obtaining step for obtaining a reference name of a data file to be obtained;

a reception step for receiving multiplexed data into which a plurality of indirect directory message blocks, a plurality of data blocks, and data of at least one direct directory message body have been multiplexed, each of the indirect directory message blocks including an identifier of the indirect directory message block and an indirect directory message body that is used for specifying an identifier of a data block corresponding to a data file belonging to a first directory according to a name of the data file and is used for specifying an identifier of an indirect directory message block corresponding to a second directory belonging to the first directory according to a name of the second directory for each directory;

a separation step for extracting indirect directory message blocks, data blocks, and data of direct directory message body from the received multiplexed data and outputting the extracted indirect directory message blocks, data blocks, and direct directory message body data;

a direct reference step for outputting, when the direct directory message body stored in the storage means includes the reference name that has been obtained at the reference name obtaining step, a data block identifier that is directly specified according to the reference name according to the direct directory message body;

a key information creation step for separating, when the direct directory message body stored in the storage means does not include the reference name that has been obtained at the reference name obtaining step, a directory name and a file name in the reference name to create key information, and outputting the created key information;

an indirect reference step for outputting, when key information output at the key information creation step is a predetermined directory name, an identifier of an indirect directory message block of the predetermined directory name;

an indirect directory message block selection step for selecting an indirect directory message block corresponding to the key information from the indirect directory message blocks that has been output at the separation step according to the indirect directory message block identifier that has been output at the indirect reference step;

an indirect directory message body extraction step for extracting an indirect directory message body from the selected indirect directory message block, wherein when the key information that has been output at the key information creation step is not a predetermined directory name, an identifier corresponding to the key information is repeatedly retrieved from the indirect directory message body that has been extracted at the indirect directory message body extraction step and the retrieved identifier is output until a data block identifier is retrieved at the indirect reference step;

a data block selection step for selecting a data block corresponding to the key information from the data blocks that has been output at the separation step according to an identifier that has been output at one of the direct reference step and the indirect reference step and extracting a data file from the selected data block;

a direct directory message body selection step for selecting data of a direct directory message body corresponding to the data block from the data of direct directory message body that has been output at the separation step; and an updating step for storing the selected direct directory message body data at the storage step.

14. A computer-readable recording medium that records a data transmission program for transmitting a file system having a directory structure, the data transmission program has a computer execute steps, comprising:

an obtaining step for obtaining a plurality of indirect directory message blocks, a plurality of data blocks, and at least one direct directory message body, each of the indirect directory message blocks including an identifier of the indirect directory message block and an indirect directory message body that is used for specifying an identifier of a data block corresponding to a data file belonging to a first directory according to a name of the data file and is used for specifying an identifier of an indirect directory message block corresponding to a second directory belonging to the first directory according to a name of the second directory for each directory, a data block includes an identifier of the data block and a data file, a direct directory message body is used to directly specify an identifier of a data block corresponding to a reference name starting from a predetermined directory name;

a multiplexing step for multiplexing the obtained indirect directory message blocks, the obtained data blocks, and data of the obtained direct directory message body, and creating multiplexed data; and a transmission step for transmitting the created multiplexed data.

15. A computer-readable recording medium that records transmission and reception data for transmitting and receiving a file system having a directory structure, the transmission and reception data being characterized by multiplexing of (1) a plurality of indirect directory message blocks, each of the indirect directory message blocks including an identifier of the indirect directory message block and an indirect directory message body that is used for specifying an identifier of a data block corresponding to a data file belonging to a first directory according to a name of the data file and is used for specifying an identifier of an indirect directory message block corresponding to a second directory belonging to the first directory according to a name of the second directory for each directory;

(2) a plurality of data blocks, each of the data blocks including a data file and an identifier of the data block; and (3) data of at least one direct directory message body that is information used for directly specifying an identifier of a data block corresponding to a reference name starting from a predetermined directory name according to the reference name into the transmission and reception data.

16. The computer-readable recording medium according to claim 15, wherein direct directory message body data is information that has been multiplexed into information used for specifying the first data block and directly specifies an identifier of a second data block according to a reference name of the second data block that is expected to be successively selected after a selection of the first data block.

* * * * *